US008997956B2

(12) United States Patent
Iwase et al.

(10) Patent No.: US 8,997,956 B2
(45) Date of Patent: *Apr. 7, 2015

(54) VEHICLE DRIVE DEVICE

(75) Inventors: Mikio Iwase, Anjo (JP); Tomohide Suzuki, Kariya (JP); Naoya Jinnai, Anjo (JP); Tatsuya Okishima, Chiryni (JP); Toshihiko Kamiya, Toyota (JP); Terufumi Miyazaki, Toyota (JP); Yukihiko Ideshio, Nissin (JP)

(73) Assignees: Aisin AW Co., Ltd., Anjo (JP); Toyota Jidosha Kabushiki Kaisha, Toyota (JP)

( * ) Notice: Subject to any disclaimer, the term of this patent is extended or adjusted under 35 U.S.C. 154(b) by 263 days.

This patent is subject to a terminal disclaimer.

(21) Appl. No.: 12/926,447

(22) Filed: Nov. 18, 2010

(65) Prior Publication Data

US 2011/0240431 A1    Oct. 6, 2011

(30) Foreign Application Priority Data

Nov. 19, 2009 (JP) .................................. 2009-264381
Mar. 5, 2010 (JP) .................................. 2010-049192
Mar. 5, 2010 (JP) .................................. 2010-049193
Nov. 2, 2010 (JP) .................................. 2010-246513

(51) Int. Cl.
*F16D 25/063* (2006.01)
*B60K 6/485* (2007.10)
(Continued)

(52) U.S. Cl.
CPC *F16H 45/02* (2013.01); *B60K 6/26* (2013.01); *B60K 6/405* (2013.01); *B60K 6/48* (2013.01); *F16H 2045/0284* (2013.01); *Y02T 10/6221* (2013.01)

(58) Field of Classification Search
USPC .......................................... 192/85.25, 85.38
See application file for complete search history.

(56) References Cited

U.S. PATENT DOCUMENTS

| 3,308,686 A | 3/1967 | Magg et al. |
| 4,466,502 A | 8/1984 | Sakai |

(Continued)

FOREIGN PATENT DOCUMENTS

| CN | 1340009 A | 3/2002 |
| CN | 1343585 A | 4/2002 |

(Continued)

OTHER PUBLICATIONS

May 6, 2011 Search Report issued in International Patent Application No. PCT/JP2011/053886.

(Continued)

*Primary Examiner* — Gene Crawford
*Assistant Examiner* — Ryan Dodd
(74) *Attorney, Agent, or Firm* — Oliff PLC

(57) ABSTRACT

A rotary electric drive device for a vehicle configured to couple a combustion engine to a wheel. The drive device includes an engagement device selectively drivingly connecting the input member with the rotary electric machine and a fluid coupling. The engagement device includes a differential pressure generating chamber that receives oil supply so as to apply hydraulic pressure to a side of the pressing member opposite to a side to which hydraulic pressure for operation is applied. A body portion housing chamber housing a body portion of the fluid coupling and the differential pressure generating chamber are structured as oil chambers independent of each other. The drive device includes a coupling supply oil passage supplying oil to the body portion housing chamber and a differential pressure supply oil passage supplying the oil to the differential pressure generating chamber.

18 Claims, 6 Drawing Sheets

(51) Int. Cl.
*F16H 45/02* (2006.01)
*B60K 6/26* (2007.10)
*B60K 6/405* (2007.10)
*B60K 6/48* (2007.10)

(56) References Cited

U.S. PATENT DOCUMENTS

| | | | |
|---|---|---|---|
| 6,092,985 A | 7/2000 | Winkam | |
| 6,142,280 A * | 11/2000 | Koike | 192/85.25 |
| 6,258,001 B1 | 7/2001 | Wakuta et al. | |
| 6,340,339 B1 | 1/2002 | Tabata et al. | |
| 6,341,584 B1 | 1/2002 | Itoyama et al. | |
| 6,492,742 B1 | 12/2002 | Fujikawa et al. | |
| 6,524,216 B2 | 2/2003 | Suzuki et al. | |
| 6,533,692 B1 | 3/2003 | Bowen | |
| 6,585,066 B1 | 7/2003 | Koneda et al. | |
| 6,590,306 B2 | 7/2003 | Terada | |
| 6,679,796 B2 | 1/2004 | Sugano | |
| 6,719,076 B1 | 4/2004 | Tabata et al. | |
| 6,863,140 B2 | 3/2005 | Noreikat et al. | |
| 6,935,450 B1 | 8/2005 | Tsuzuki et al. | |
| 7,059,443 B2 | 6/2006 | Kira | |
| 7,086,978 B2 | 8/2006 | Aikawa et al. | |
| 7,114,484 B2 | 10/2006 | Kaita et al. | |
| 7,114,604 B2 | 10/2006 | Masuya | |
| 7,396,308 B2 | 7/2008 | Tabata et al. | |
| 7,489,114 B2 | 2/2009 | Nomura et al. | |
| 7,810,592 B2 | 10/2010 | Klemen et al. | |
| 7,954,578 B2 * | 6/2011 | Kim et al. | 180/65.22 |
| 8,155,848 B2 | 4/2012 | Kobayashi et al. | |
| 8,322,504 B2 * | 12/2012 | Mueller et al. | 192/85.25 |
| 8,333,680 B2 * | 12/2012 | Kasuya et al. | 477/5 |
| 8,360,186 B2 | 1/2013 | Yamamoto et al. | |
| 8,590,649 B2 | 11/2013 | Osawa et al. | |
| 8,602,940 B2 | 12/2013 | Kuwahara et al. | |
| 8,636,090 B2 | 1/2014 | Nomura et al. | |
| 2002/0043883 A1 | 4/2002 | Shimizu | |
| 2003/0127262 A1 | 7/2003 | Noreikat et al. | |
| 2004/0029677 A1 | 2/2004 | Mori et al. | |
| 2004/0154846 A1 | 8/2004 | Kira | |
| 2005/0066933 A1 | 3/2005 | Kaita et al. | |
| 2005/0079942 A1 | 4/2005 | Bauknecht et al. | |
| 2006/0100060 A1 | 5/2006 | Kraska et al. | |
| 2006/0272869 A1 | 12/2006 | Hidaka et al. | |
| 2006/0289209 A1 * | 12/2006 | Grosspietsch et al. | 180/65.2 |
| 2007/0108857 A1 * | 5/2007 | Nomura et al. | 310/78 |
| 2007/0175723 A1 * | 8/2007 | Blessing et al. | 192/48.8 |
| 2007/0175726 A1 | 8/2007 | Combes et al. | |
| 2007/0267270 A1 | 11/2007 | Sudau et al. | |
| 2008/0047799 A1 | 2/2008 | Combes et al. | |
| 2009/0054203 A1 * | 2/2009 | Heeke | 477/15 |
| 2009/0100965 A1 | 4/2009 | Sanji et al. | |
| 2009/0271079 A1 | 10/2009 | Kobayashi et al. | |
| 2009/0283344 A1 | 11/2009 | Arnold et al. | |
| 2010/0038201 A1 | 2/2010 | Mueller et al. | |
| 2010/0062899 A1 * | 3/2010 | Engelmann et al. | 477/86 |
| 2010/0105518 A1 | 4/2010 | Kasuya et al. | |
| 2010/0132504 A1 | 6/2010 | Miller et al. | |
| 2010/0236856 A1 | 9/2010 | Nomura et al. | |
| 2011/0118079 A1 | 5/2011 | Mueller et al. | |
| 2011/0121692 A1 * | 5/2011 | Iwase et al. | 310/67 R |
| 2011/0240430 A1 * | 10/2011 | Iwase et al. | 192/3.29 |
| 2011/0240431 A1 | 10/2011 | Iwase et al. | |
| 2012/0217830 A1 * | 8/2012 | Iwase et al. | 310/78 |
| 2012/0247911 A1 | 10/2012 | Noda et al. | |
| 2012/0258838 A1 | 10/2012 | Hartz et al. | |
| 2012/0318630 A1 * | 12/2012 | Iwase et al. | 192/85.01 |
| 2012/0319514 A1 * | 12/2012 | Iwase et al. | 310/78 |
| 2013/0008284 A1 | 1/2013 | Sada et al. | |
| 2013/0009522 A1 | 1/2013 | Ozaki et al. | |
| 2013/0057117 A1 | 3/2013 | Suzuki et al. | |

FOREIGN PATENT DOCUMENTS

| | | |
|---|---|---|
| CN | 101018687 A | 8/2007 |
| DE | 102 97 304 T5 | 12/2004 |
| DE | 10 2004 033 141 A1 | 2/2006 |
| DE | 10 2006 023 289 A1 | 11/2007 |
| DE | 10 2009 022 272 A1 | 12/2009 |
| EP | 1 800 929 A2 | 6/2007 |
| FR | 2 830 589 A1 | 4/2003 |
| JP | U3-69748 | 7/1991 |
| JP | B2-3-72507 | 11/1991 |
| JP | A 7-217721 | 8/1995 |
| JP | A-8-277859 | 10/1996 |
| JP | B2 3080612 | 8/2000 |
| JP | A-2002-220078 | 8/2002 |
| JP | A 2005-212494 | 8/2005 |
| JP | A-2006-137406 | 6/2006 |
| JP | A-2007-015810 | 1/2007 |
| JP | A-2007-071083 | 3/2007 |
| JP | A 2007-118717 | 5/2007 |
| JP | A-2009-001127 | 1/2009 |
| JP | A 2009-1165 | 1/2009 |
| JP | A-2009-011010 | 1/2009 |
| JP | A 2009-101730 | 5/2009 |
| JP | A-2009-262659 | 11/2009 |
| WO | WO 2008/092426 A2 | 8/2008 |
| WO | WO 2010/017786 | 2/2010 |

OTHER PUBLICATIONS

May 11, 2011 Search Report issued in International Patent Application No. PCT/JP2011/053887.
Jul. 8, 2011 Search Report issued in International Patent Application No. PCT/JP2011/055720.
May 31, 2011 Search Report issued in International Patent Application No, PCT/JP2011/055721.
Feb. 8, 2011 Search Report issued in International Patent Application No. PCT/JP2010/070715 (with translation).
Feb. 8, 2011 Search Report issued in International Patent Application No. PCT/JP2010/070716 (with translation).
Feb. 8, 2011 Search Report issued in International Patent Application No. PCT/JP2010/070717 (with translation).
Feb. 8, 2011 International Search Report issued in PCT/JP2010/070714 (with translation).
U.S. Appl. No. 12/948,297, filed Nov. 17, 2010.
U.S. Appl. No. 13/522,597, filed Jul. 17, 2012.
U.S. Appl. No. 13/522,426, filed Jul. 16, 2012.
U.S. Appl. No. 12/926,446, filed Nov. 18, 2010.
U.S. Appl. No. 13/502,909, filed Apr. 19, 2012.
U.S. Appl. No. 13/522,135, filed Jul. 13, 2012.
U.S. Appl. No. 13/522,651, filed Jul. 17, 2012.
Apr. 26, 2013 Notice of Allowance issued in U.S. Appl. No. 12/926,446.
Mar. 28, 2013 Office Action issued in Japanese Patent Application No. 2010-049193 (English Translation only).
Feb. 4, 2013 Office Action issued in U.S. Appl. No. 12/926,446.
Aug. 30, 2013 Notice of Allowance issued in U.S. Appl. No. 12/926,446.
Dec. 26, 2012 Office Action issued in U.S. Appl. No. 13/522,135.
Jun. 27, 2013 Partial Translation of Notification of Reasons for Refusal issued in Japanese Application No. JP2010-246511 (English Partial Translation Only).
Nov. 7, 2013 Japanese Office Action issued in Japanese Patent Application No. 2010-246515 (with translation).
Dec. 9, 2013 Corrected Notice of Allowability issued in U.S. Appl. No. 12/926,446.
Nice et al., "How Clutches Work," HowStuffWorks.com, Oct. 16, 2007, <http://auto.howstuffworks.com/clutch.htm>.
Mar. 6, 2014 Office Action issued in U.S. Appl. No. 13/502,909.
Mar. 7, 2014 Office Action issued in U.S. Appl. No. 13/522,597.
Aug. 2, 2013 Office Action issued in U.S. Appl. No. 13/522,597 issued in the name of Suyama.
Apr. 25, 2014 European Search Report issued in EP 10 83 1658.
Apr. 25, 2014 Notice of Allowance issued in U.S. Appl. No. 13/522,426.

(56) References Cited

OTHER PUBLICATIONS

May 6, 2014 Notice of Allowance issued in U.S. Appl. No. 12/948,297.

Jun. 20, 2014 Notice of Allowance issued in U.S. Appl. No. 13/502,909.

Sep. 11, 2014 Office Action issued in U.S. Appl. No. 13/522,597.

* cited by examiner

VEHICLE DRIVE DEVICE

INCORPORATION BY REFERENCE

The disclosure of Japanese Patent Applications No. 2010-246513 filed on Nov. 2, 2010, No. 2009-264381 filed on Nov. 19, 2010, No. 2010-049192 filed on Mar. 5, 2010, and No. 2010-049193 filed on Mar. 5, 2010, including the specification, drawings and abstract is incorporated herein by reference in its entirety.

BACKGROUND OF THE INVENTION

The present invention relates to a drive device for a vehicle equipped with an input member drivingly connected to an internal combustion engine, an output member drivingly connected to a wheel, a rotary electric machine, a fluid coupling, an engagement device selectively drivingly connecting the input member with the rotary electric machine and the fluid coupling, and a case housing at least the rotary electric machine, the engagement device, and the fluid coupling.

DESCRIPTION OF THE RELATED ART

As a drive device for a vehicle such as those described above, for example, a device disclosed in Japanese Patent Application Publication No. JP-A-2006-137406 described below has already been known. As shown in FIG. 1 and so on of the Japanese Patent Application Publication No. JP-A-2006-137406, in the drive device for a vehicle, a rotary electric machine (motor in the Japanese Patent Application Publication No. JP-A-2006-137406; hereinafter the same reference applies), a fluid coupling (torque converter 1), and an engagement device (clutch mechanism 16) selectively drivingly establishing a connection therebetween are arranged in a case (motor housing 6) housing these devices. Oil for operation is supplied to an operating oil pressure chamber of the engagement device from an oil passage formed in a support wall (engine-side sidewall portion) of an internal combustion engine (engine). Note that, in the drive device for a vehicle disclosed in the Japanese Patent Application Publication No. JP-A-2006-137406, it is interpreted that an engagement member (friction element) in the engagement device is arranged in an open space in the case without being separated from other parts, and supplied from radially inside with oil after, for example, lubricating bearings (bearings 9, 14, 15, and 21).

In the drive device for a vehicle disclosed in the Japanese Patent Application Publication No. JP-A-2006-137406, it is considered possible to employ a structure in which the engagement member of the engagement device is arranged in an independent sealed space in the case. That is, it is considered possible to employ a structure that includes an oil-tight differential pressure generating chamber to which oil regulated to a pressure different from a pressure supplied to the operating oil pressure chamber is supplied, and the engagement member is housed in the differential pressure generating chamber. In this regard, the device of the Japanese Patent Application Publication No. JP-A-2006-137406 has, as an independent sealed space in the case, only a body portion housing chamber housing a body portion of the fluid coupling. For that reason, in the case of applying the above-described structure to the device of the Japanese Patent Application Publication No. JP-A-2006-137406, a structure is assumed in which a common chamber is used as both the body portion housing chamber and the differential pressure generating chamber while using a common oil passage for supplying oil to those chambers, and the engagement member is housed in the body portion housing chamber.

In this case, rotational states of a pump impeller and a turbine runner of the fluid coupling are respectively controlled by a hydraulic pressure to the body portion housing chamber, whereas, on the other hand, the engagement device is controlled by a differential pressure between the hydraulic pressure supplied to the operating oil pressure chamber and the hydraulic pressure supplied to the differential pressure generating chamber shared with the body portion housing chamber. Each of these control operations of the fluid coupling and the engagement device is given an independent target, and each of the fluid coupling and the engagement device is controlled so as to meet the target. However, in the device of the Japanese Patent Application Publication No. JP-A-2006-137406, because the body portion housing chamber controlling the rotational states of the fluid coupling is shared with the differential pressure generating chamber controlling an engagement state of the engagement device, the hydraulic pressure supplied to those chambers is also shared therebetween. As a result, when one of the fluid coupling and the engagement device is being controlled, the state of the other may be influenced by the control, whereas when both of the fluid coupling and the engagement device are controlled at the same time, such simultaneous control may influence each other in terms of controllability.

SUMMARY OF THE INVENTION

Therefore, it is desired to realize a drive device for a vehicle that can appropriately supply oil to an engagement member of an engagement device while favorably maintaining controllability of both the engagement device and a fluid coupling.

A drive device for a vehicle according to a first aspect of the present invention includes an input member drivingly connected to an internal combustion engine, an output member drivingly connected to a wheel, a rotary electric machine, a fluid coupling, an engagement device selectively drivingly connecting the input member with the rotary electric machine and the fluid coupling, and a case housing at least the rotary electric machine, the engagement device, and the fluid coupling. The drive device for a vehicle has a characteristic structure in which the engagement device includes an engagement member, a pressing member pressing the engagement member, and a differential pressure generating chamber that houses the engagement member and receives oil supply so as to apply hydraulic pressure to a side of the pressing member opposite to a side to which hydraulic pressure for operation is applied, and a body portion housing chamber housing a body portion of the fluid coupling and the differential pressure generating chamber are structured as oil chambers independent of each other, and the drive device includes a coupling supply oil passage supplying oil to the body portion housing chamber and a differential pressure supply oil passage supplying the oil to the differential pressure generating chamber.

Note that the term "drivingly connected" refers to a state in which two rotational elements are connected so as to be capable of transmitting a driving force, and is used as a concept including a state in which the two rotational elements are connected so as to rotate as a unit with each other, or a state in which the two rotational elements are connected so as to be capable of transmitting the driving force via one or two or more transmitting members. Such transmitting members include various members that transmit rotation at the same speed or at a changed speed, such as shafts, gear mechanisms, belts, and chains. Such transmitting members may also include engagement devices that selectively transmit the rotation and the driving force, such as friction clutches and dog clutches.

The term "rotary electric machine" is used as a concept including all of a motor (electric motor), a generator (electric generator), and a motor-generator that serves as a motor or a generator depending on the necessity.

Moreover, the term "fluid coupling" is used as a concept including both of a torque converter having a torque amplifying function and an ordinary fluid coupling having no torque amplifying function.

According to the first aspect, the differential pressure generating chamber is arranged with the engagement member of the engagement device, and supplied with oil via the differential pressure supply oil passage. Consequently, the oil can be appropriately supplied to the engagement member of the engagement device.

Also, according to the first aspect, the pressing member can be operated in response to the differential pressure between the hydraulic pressure supplied to the differential pressure generating chamber and the hydraulic pressure for operating the pressing member, thereby controlling engagement and disengagement of the engagement device. In this case, the body portion chamber housing the body portion of the fluid coupling and the differential pressure generating chamber are formed independently of each other, and the oil is independently supplied to the body portion housing chamber and the differential pressure generating chamber via the coupling supply oil passage and the differential pressure supply oil passage, respectively. For that reason, even when one of the fluid coupling and the engagement device is being controlled, the state of the other is not influenced by the control, and moreover, even when both of the fluid coupling and the engagement device are controlled at the same time, such simultaneous control does not influence each other in terms of controllability. Therefore, the controllability of both the engagement device and the fluid coupling can be favorably maintained.

Consequently, the drive device for a vehicle can be achieved that can appropriately supply oil to the engagement member of the engagement device while favorably maintaining the controllability of both the engagement device and the fluid coupling.

According to a second aspect of the present invention, the case may include a support wall extending at least radially and a cylindrical projecting portion axially projecting from the support wall, and the engagement device be arranged in a position having a portion overlapping with the cylindrical projecting portion when viewed radially, and the cylindrical projecting portion be formed with the differential pressure supply oil passage.

Note that the expression "having a portion overlapping when viewed in a certain direction" regarding arrangement of two members means that, when a view point is moved in each direction perpendicular to a line of sight with the certain direction serving as the line of sight, the view point from which the two members look overlapped with each other exists in at least a part of the area.

According to the second aspect, when compared with a case in which the cylindrical projecting portion and the engagement device are arranged axially side by side, an axial length can be reduced by an amount of overlap of the cylindrical projecting portion and the engagement device when viewed radially. Therefore, the entire device can be downsized. Because a differential pressure supply oil passage is formed in the cylindrical projecting portion provided as a unit with the support wall of the case, the oil can be supplied to the engagement member in a stable manner. Moreover, when compared with a case in which the differential pressure supply oil passage is formed inside the input member, for example, an oil passage structure can be simplified, whereby manufacturability of the drive device for a vehicle can be improved.

According to a third aspect of the present invention, the fluid coupling and the engagement device may be connected so as to rotate as a unit with each other and arranged axially adjacent to each other, the engagement device include an operating oil pressure chamber to which the hydraulic pressure for operation of the pressing member is supplied, and the differential pressure generating chamber be arranged between the operating oil pressure chamber and the fluid coupling in the axial direction.

According to the third aspect, because the differential pressure generating chamber can be formed by using a part of the fluid coupling arranged axially adjacent to the engagement device, all of the operating oil pressure chamber, the differential pressure generating chamber, and the fluid coupling can be arranged in a compact manner by being arranged axially side by side. Consequently, the entire device can be downsized by reducing the axial length.

According to a fourth aspect of the present invention, the fluid coupling may include a cover portion housing the body portion, and the engagement device may further include an engagement input side member and an engagement output side member paired with the engagement input side member, the engagement output side member and the cover portion be connected so as to rotate as a unit with each other, the input member arranged so as to penetrate through the radially inside of the cylindrical projecting portion and the engagement input side member be connected so as to rotate as a unit with each other to structure an input transmission member, a first seal portion seal between the engagement output side member and the cover portion while a second seal portion seals between the input transmission member and the cylindrical projecting portion, and the differential pressure generating chamber be defined by the engagement output side member, the cover portion, the input transmission member, and the cylindrical projecting portion, and formed as a space sealed by the first seal portion and the second seal portion.

According to the fourth aspect, the differential pressure generating chamber housing the engagement member of the engagement device can be appropriately formed by the cover portion housing the body portion of the fluid coupling, the engagement output side member connected so as to rotate as a unit with the cover portion, the cylindrical projecting portion provided as a unit with the support wall of the case, and the input member constituting the input transmission member arranged on the radially inside of the cylindrical projecting portion. Then, the differential pressure generating chamber can be appropriately formed as a sealed space by the first seal portion provided between the engagement output side member and the cover portion, and the second seal portion provided between the input transmission member and the cylindrical projecting portion. Consequently, cooling performance of the engagement member can be improved, for example, by achieving a state of filling up the differential pressure generating chamber with oil.

According to a fifth aspect of the present invention, the engagement output side member may include an axial extension portion extending along the axial direction and a radial extension portion extending radially outward from the axial extension portion, the cover portion include an axially extending portion extending along the axial direction and a radially extending portion extending radially outward from the axially extending portion, the axial extension portion and the axially extending portion radially contact and fit against each other so as to constitute a radially fitting portion that determines mutual positioning in the radial direction, and the radial extension portion and the radially extending portion be fastened with each other by a bolt so as to constitute a fastening portion, and the first seal portion be formed of the axial extension portion and the axially extending portion that constitute the radially fitting portion, and a seal member arranged therebetween.

According to the fifth aspect, the engagement output side member and a coupling input side member can be appropriately mutually positioned in the radial direction by constituting the radially fitting portion by the axial extension portion of the engagement output side member and the axially extending portion of the cover portion, each of which has an axially extending portion. In this case, the structure for mutually positioning the engagement output side member and the cover portion in the radial direction by the radially fitting portion is shared with the structure for sealing between the engagement output side member and the cover portion via the seal member. The entire device can be thus downsized by providing a simple structure. Furthermore, the fastening portion is provided between the radial extension portion of the engagement output side member and the radially extending portion of the cover portion, each of which has a radially extending portion, whereby the engagement output side member can be appropriately fastened with the coupling input side member by the bolt.

According to a sixth aspect of the present invention, the cylindrical projecting portion may be provided so as to project from the support wall arranged on the internal combustion engine side in the axial direction relative to the engagement device toward the side opposite to the internal combustion engine, and the differential pressure supply oil passage have an axial oil passage axially extending in the cylindrical projecting portion to communicate with the differential pressure generating chamber via an end face opening portion formed in an end face of the cylindrical projecting portion on the side opposite to the internal combustion engine.

According to the sixth aspect, the oil supplied through the axial oil passage constituting at least a part of the differential pressure supply oil passage can be appropriately supplied to the differential pressure generating chamber via the end face opening portion formed in the end face of the cylindrical projecting portion on the side opposite to the internal combustion engine.

According to a seventh aspect of the present invention, the cylindrical projecting portion may further be formed with, separately from the differential pressure supply oil passage, a differential pressure discharge oil passage communicating with the differential pressure generating chamber for discharging oil from the differential pressure chamber.

According to the seventh aspect, oil can be supplied to the differential pressure generating chamber via the differential pressure supply oil passage formed in the cylindrical projecting portion, and the oil thus supplied can be discharged from the differential pressure generating chamber via the differential pressure discharge oil passage formed also in the cylindrical projecting portion. Consequently, a flow of the oil flowing sequentially from the differential pressure supply oil passage via the engagement member further to the differential pressure discharge oil passage can be appropriately formed in the differential pressure generating chamber. Therefore, the engagement member of the engagement device can be cooled efficiently by the oil flowing sequentially through inside of the differential pressure generating chamber.

According to an eighth aspect of the present invention, the engagement device may further include an engagement input side member and an engagement output side member paired with the engagement input side member, the engagement input side member radially extend in the differential pressure generating chamber, and a radially inside end portion of the engagement input side member be connected to the input member arranged so as to penetrate through the radially inside of the cylindrical projecting portion, the differential pressure supply oil passage communicate with a first space in the differential pressure generating chamber on the internal combustion engine side relative to the engagement input side member, and the differential pressure discharge oil passage communicate, via a communication oil passage formed inside the input member, with a second space in the differential pressure generating chamber on the side opposite to the internal combustion engine relative to the engagement input side member.

According to the eight aspect, even if an opening portion of the differential pressure discharge oil passage in the cylindrical projecting portion is not formed so as to directly face the differential pressure generating chamber, the opening portion of the differential pressure discharge oil passage can appropriately communicate with the differential pressure generating chamber via the communication oil passage. Furthermore, the differential pressure supply oil passage and the differential pressure discharge oil passage respectively communicate with the first space and the second space provided on both axial sides of the engagement input side member that is connected to the input member and radially extends in the differential pressure generating chamber. Therefore, in the differential pressure generating chamber and in the input member, a flow of the oil can be appropriately formed from the differential pressure supply oil passage, via the first space and the engagement member, further via the second space and the communication oil passage, to the differential pressure discharge oil passage. Consequently, the engagement member of the engagement device can be cooled efficiently.

According to a ninth aspect of the present invention, an input bearing radially supporting the input member may be arranged between the cylindrical projecting portion and the input member, and side faces on both axial sides of the input bearing communicate with the first space and the second space, respectively, either directly or via the communication oil passage.

According to the ninth aspect, the input member arranged so as to penetrate through the radially inside of the cylindrical projecting portion can be appropriately radially supported by the cylindrical projecting portion in a rotatable state via the input bearing. Furthermore, the side faces on both axial sides of the input bearing respectively communicate, either directly or via the communication oil passage, with the first space and the second space, each of which constitutes the same differential pressure generating chamber. Therefore, hydraulic pressure applied to the side faces on both axial sides of the input bearing can be equalized to each other. Consequently, leakage of oil from between the input bearing and the cylindrical projecting portion and from between the input bearing and the input member needs not be taken into account, thereby simplifying the structure of the input bearing and reducing cost.

According to a tenth aspect of the present invention, the cylindrical projecting portion may further be formed with an operating oil supply passage supplying oil for operation of the pressing member to the operating oil pressure chamber of the engagement device, and the operating oil supply passage include an axial oil passage axially extending in the cylindrical projecting portion, and a radial oil passage radially extending from the axial oil passage and communicating with the operating oil pressure chamber via an outer circumferential opening portion formed in an outer circumferential face of the cylindrical projecting portion.

According to the tenth aspect, the oil supplied through the axial oil passage and the radial oil passage constituting at least a part of the operating oil supply passage can be appropriately supplied to the operating oil pressure chamber via the outer circumferential opening portion. Because the cylindrical projecting portion provided as a unit with the support wall of the case is further formed with the operating oil supply passage in addition to the differential pressure supply oil passage, the oil for operation of the pressing member can be supplied to the operating oil pressure chamber in a stable manner while supplying the oil to the engagement member in a stable manner.

According to an eleventh aspect of the present invention, the rotary electric machine may include a rotor body and a rotor support member extending radially inward from the rotor body on the internal combustion engine side relative to the engagement device so as to support the rotor body, the rotor support member be radially supported by the cylindrical projecting portion in a rotatable state via a support bearing, a third seal portion seal between the rotor support member and the cylindrical projecting portion on the internal combustion engine side relative to the support bearing, and the cylindrical projecting portion further be formed with a lubricating oil discharge passage that communicates with a bearing arrangement space defined by the cylindrical projecting portion, the rotor support member, and the third seal portion, and discharges oil that has lubricated the support bearing from the bearing arrangement space.

According to the eleventh aspect, the rotor support member and the rotor body can be appropriately supported via the support bearing on the cylindrical projecting portion of the support wall included in the case. In this structure, because the third seal portion seals the bearing arrangement space defined between the rotor support member and the cylindrical projecting portion, the support bearing can be appropriately lubricated by the oil supplied to the bearing arrangement space. Then, the oil after lubricating the support bearing can be appropriately discharged from the bearing arrangement space via the lubricating oil discharge passage formed in the cylindrical projecting portion.

DETAILED DESCRIPTION OF THE EMBODIMENTS

Figure 1:
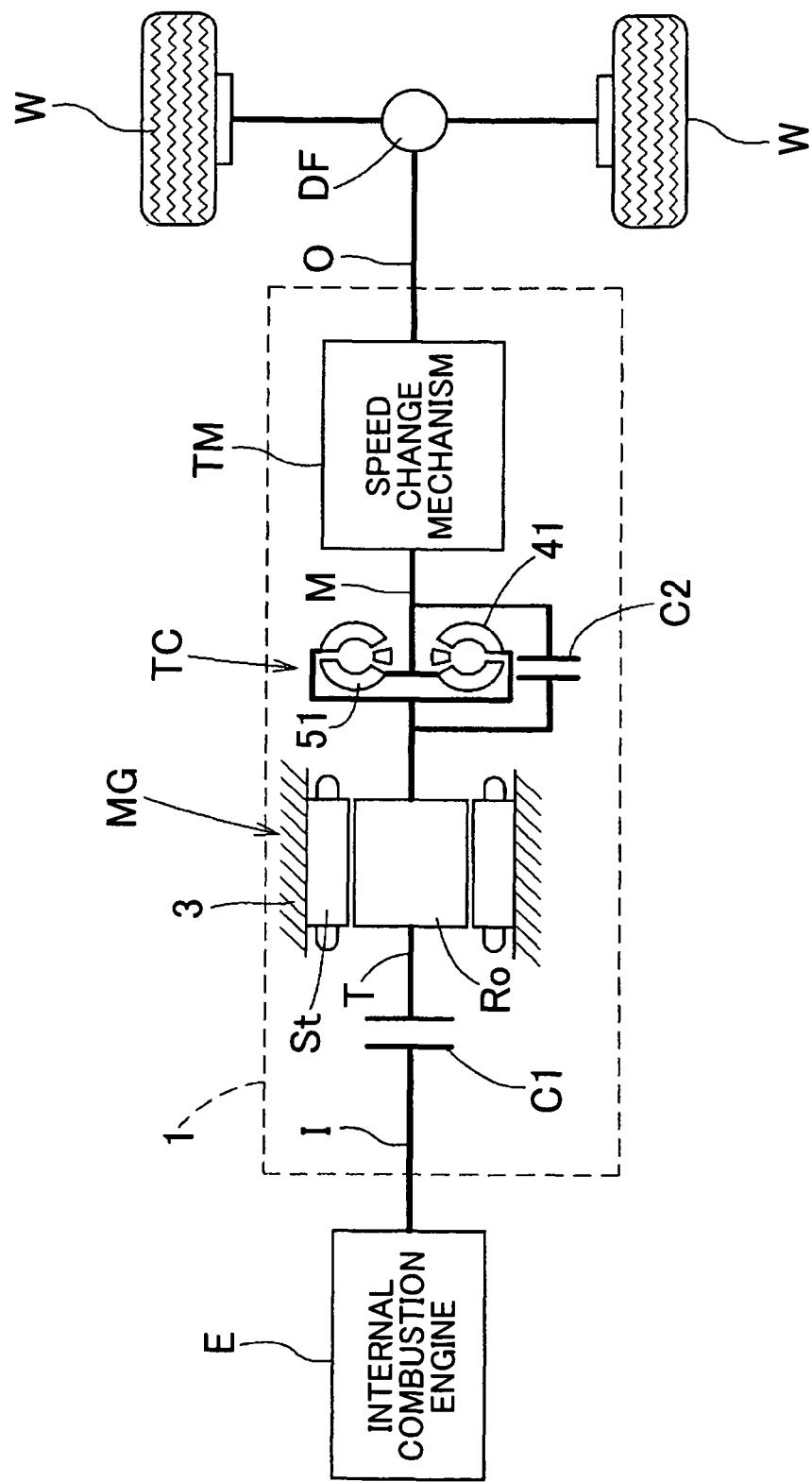
FIG. 1 is a schematic diagram showing an outline structure of a drive device according to an embodiment of the present invention.

An embodiment of the present invention will be described with reference to the accompanying drawings. FIG. 1 is a schematic diagram showing an outline structure of a drive device 1. As shown in FIG. 1, the drive device 1 is a drive device for a hybrid vehicle (hybrid drive device) that uses one or both of an internal combustion engine E and a rotary electric machine MG as a source of vehicle driving force. The drive device 1 is structured as a drive device for a so-called one-motor parallel type hybrid vehicle. The drive device 1 according to the present embodiment will be described below in detail.

1. Overall Structure of Drive Device

First of all, an overall structure of the drive device 1 according to the present embodiment will be described. As shown in FIG. 1, the drive device 1 is provided with an input shaft I drivingly connected to the internal combustion engine E serving as a first source of driving force of the vehicle, an output shaft O drivingly connected to wheels W, the rotary electric machine MG serving as a second source of driving force of the vehicle, and a torque converter TC. The drive device 1 is also provided with an input clutch C1 and a speed change mechanism TM. These components are arranged on a power transmission path in the order of the input shaft I, the input clutch C1, the rotary electric machine MG the torque converter TC, the speed change mechanism TM, and the output shaft O, from the side of the internal combustion engine E. These components are housed in a case (drive device case) 3 except a part of the input shaft I and a part of the output shaft O. In the present embodiment, the input shaft I corresponds to an "input member" in the present invention, and the output shaft O corresponds to an "output member" in the present invention.

Note that, in the present embodiment, all of the input shaft I, the rotary electric machine MG, the torque converter TC, and the output shaft O are arranged on a center axis X (refer to FIG. 2), and the drive device 1 according to the present embodiment has a single-axis structure suitable for being mounted in a vehicle of an FR (front engine, rear drive) type. Note also that, in the description below, the directions of "axial direction", "radial direction", and "circumferential direction" are defined with respect to the center axis X, unless otherwise specifically distinguished. Moreover, regarding directions along the axial direction at a particular part in the drive device 1, the direction toward the side of the internal combustion engine E (left side in FIG. 2) as one side of the axial direction is referred to as an "axial first direction A1", whereas the direction toward the side of the output shaft O (right side in FIG. 2) as the other side of the axial direction is referred to as an "axial second direction A2".

The internal combustion engine E is a device to take out power by being driven by combustion of fuel inside the engine. For example, various known engines, such as a gasoline engine and a diesel engine, can be used as the internal combustion engine E. In the present example, an output rotational shaft such as a crankshaft of the internal combustion engine E is drivingly connected to the input shaft I via a first damper 16 (refer to FIG. 2). The input shaft I is drivingly connected to the rotary electric machine MG via the input clutch C1, thus being selectively drivingly connected to the rotary electric machine MG by the input clutch C1. The internal combustion engine E is drivingly connected to the rotary electric machine MG via the input shaft I while the input clutch C1 is engaged, and separated from the rotary electric machine MG while the input clutch C1 is disengaged. In the present embodiment, the input clutch C1 corresponds to an "engagement device" in the present invention.

The rotary electric machine MG is structured to have a stator St and a rotor Ro, and can serve as a motor (electric motor) producing power by receiving electric power supply and as a generator (electric generator) producing electric power by receiving power supply. Therefore, the rotary electric machine MG is electrically connected with an electrical storage device (not shown). In the present example, a battery is used as the electrical storage device. A capacitor or the like may also be suitably used as the electrical storage device. The rotary electric machine MG operates in a power running mode by receiving the electric power supply from the battery, or charges the battery by supplying thereto the electric power generated by a torque (here, used as a synonym of "driving force") produced by the internal combustion engine E or an inertial force of the vehicle. The rotor Ro of the rotary electric machine MG is drivingly connected to a pump impeller 41 of the torque converter TC constituting a power transmission member T.

The torque converter TC is a device that converts a torque of one or both of the internal combustion engine E and the rotary electric machine MG, and transmits the converted torque to an intermediate shaft M. The torque converter TC is provided with the pump impeller 41 drivingly connected to the rotor Ro of the rotary electric machine MG, a turbine runner 51 drivingly connected to the intermediate shaft M so as to rotate as a unit therewith, and a stator 56 (refer to FIG. 2) provided between the pump impeller 41 and the turbine runner 51. The torque converter TC can transmit, via oil filled therein, a torque between the pump impeller 41 and the turbine runner 51. In that operation, when a rotational speed difference is produced between the pump impeller 41 and the turbine runner 51, a torque converted depending on a rotational speed ratio is transmitted. In the present embodiment, the torque converter TC corresponds to a "fluid coupling" in the present invention.

The torque converter TC is also provided with a lock-up clutch C2. The lock-up clutch C2 selectively drivingly connects the pump impeller 41 with the turbine runner 51. In the engaged state of the lock-up clutch C2, the torque converter TC transmits the torque of one or both of the internal combustion engine E and the rotary electric machine MG not through the oil filled inside but directly to the intermediate shaft M. The intermediate shaft M serves as an output shaft (coupling output shaft) of the torque converter TC, and also as an input shaft (speed change input shaft) of the speed change mechanism TM.

The speed change mechanism TM is a device that changes a rotational speed of the intermediate shaft M at a predetermined speed ratio and transmits the changed speed to the output shaft O. As such a speed change mechanism TM, the present embodiment uses an automatic stepped speed change mechanism provided, in a switchable manner, with a plurality of shift speeds with different speed ratios. Note that it is possible to use, as the speed change mechanism TM, another type of mechanism such as an automatic stepless speed change mechanism that can change the speed ratio in a stepless manner, or a manual stepped speed change mechanism provided, in a switchable manner, with a plurality of shift speeds with different speed ratios. The speed change mechanism TM changes the rotational speed and converts the torque of the intermediate shaft M at a predetermined speed ratio at each point of time, and transmits the changed speed and the converted torque to the output shaft O. The rotation and the torque transmitted to the output shaft O are distributed and transmitted, via a differential gear unit DF for output, to the two right and left wheels W. The drive device 1 can thus drive the vehicle to run by transmitting the torque of one or both of the internal combustion engine E and the rotary electric machine MG to the wheels W.

2. Structures of Various Parts of Drive Device

Figure 3:
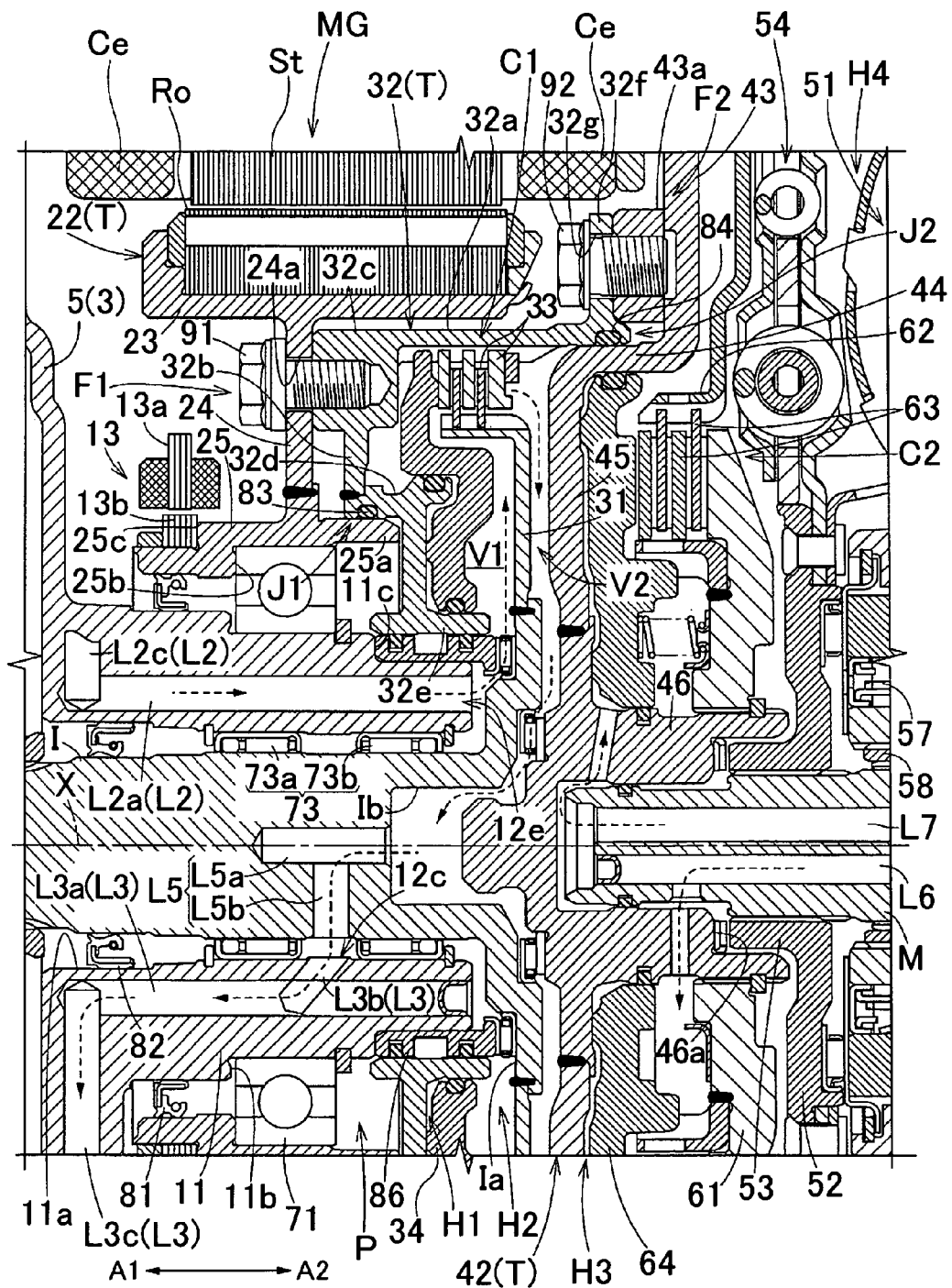
FIG. 3 is an essential part cross-sectional view of the drive device according to the embodiment of the present invention.
Figure 4:
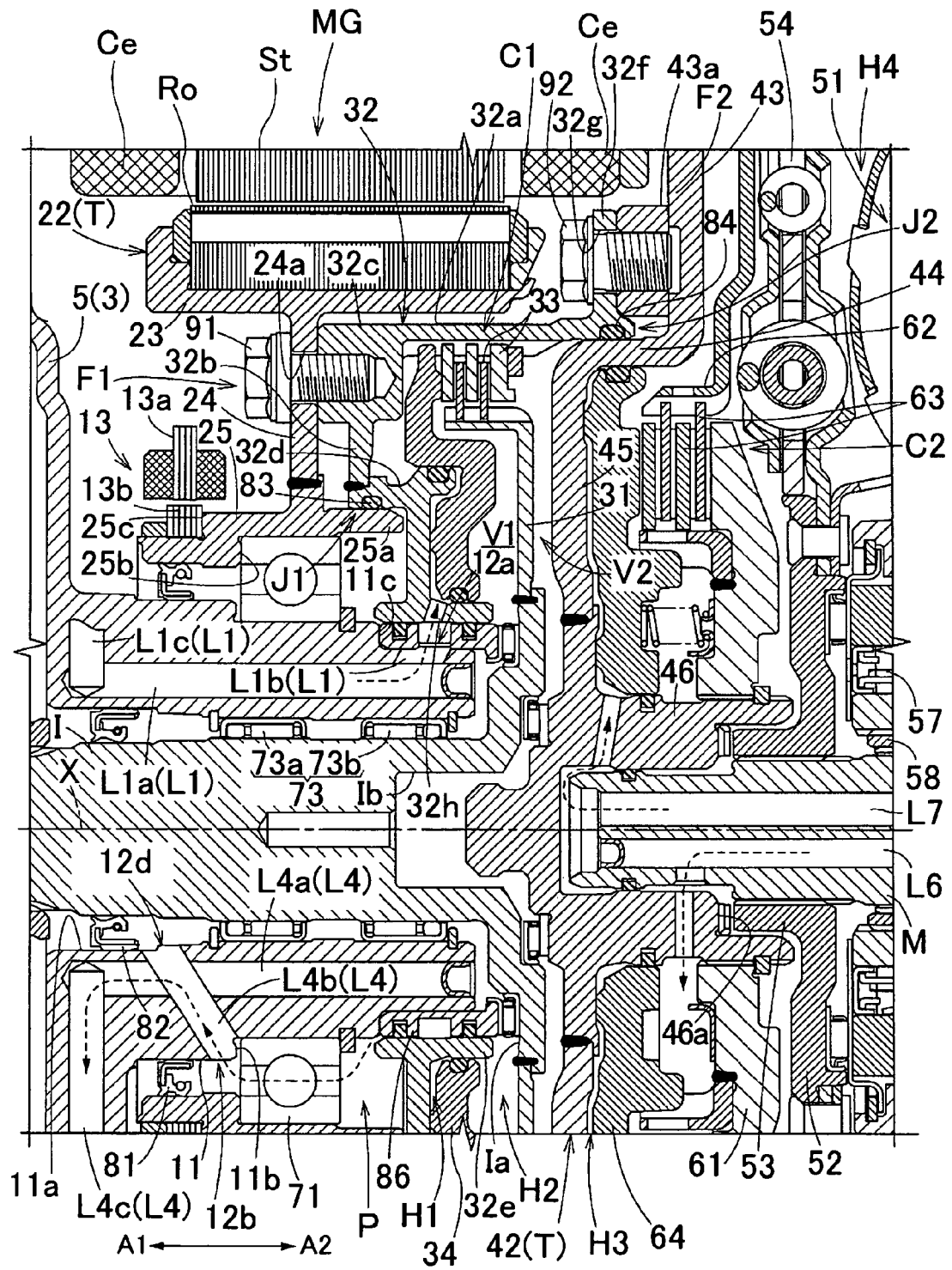
FIG. 4 is an essential part cross-sectional view of the drive device according to the embodiment of the present invention.

Next, structures of various parts of the drive device 1 according to the present embodiment will be described with reference to FIGS. 2 to 4. Note that FIG. 3 is a partial enlarged view of a cross-sectional view in FIG. 2, and FIG. 4 is a cross-sectional view at a location circumferentially different from that of FIG. 3.

2-1. Case

Figure 2:
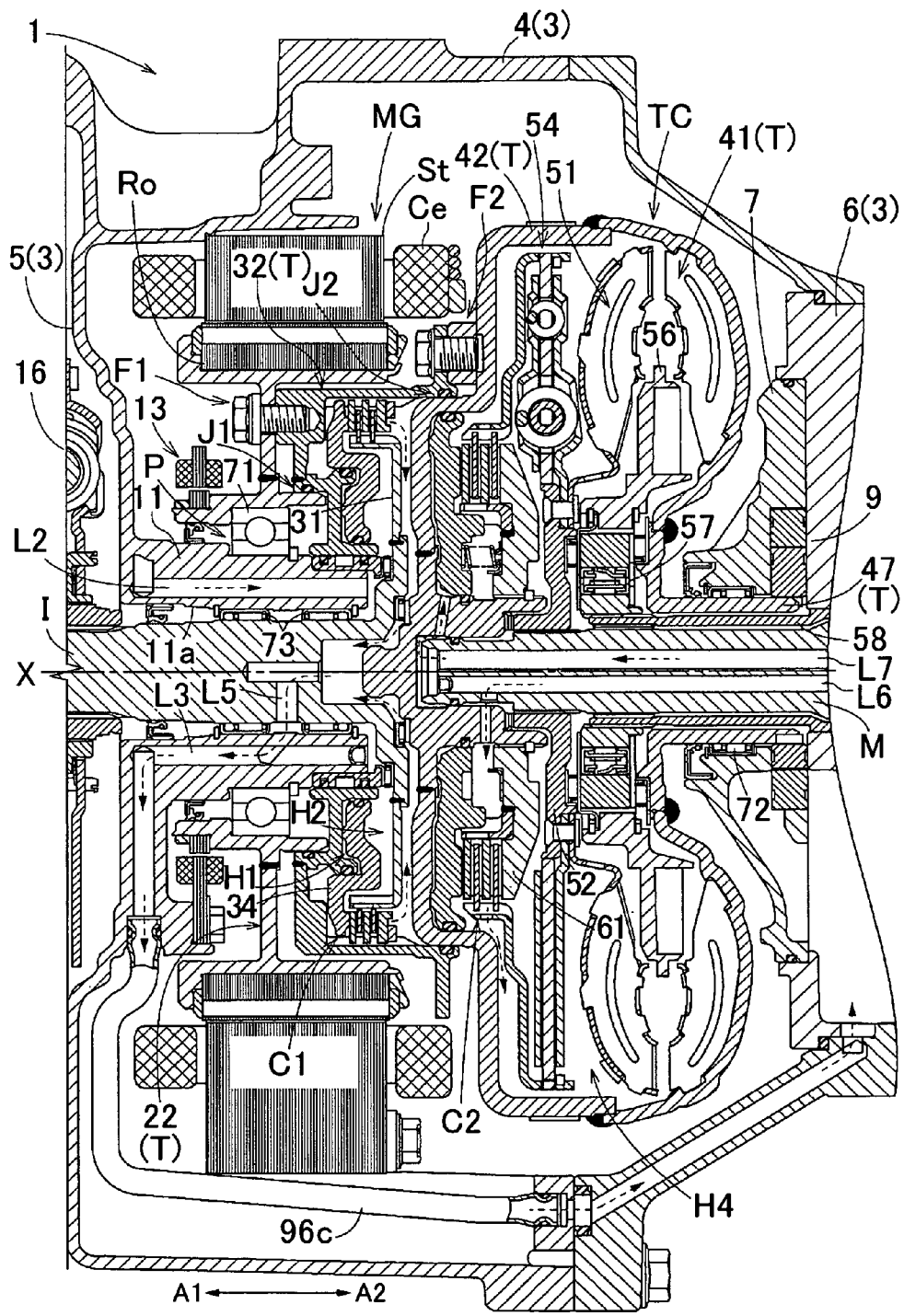
FIG. 2 is a partial cross-sectional view of the drive device according to the embodiment of the present invention.

As shown in FIG. 2, the case 3 is formed in a generally cylindrical shape. In the present embodiment, the case 3 is provided with a circumferential wall 4 having a generally cylindrical shape and covering the radially outside of parts such as the rotary electric machine MG the input clutch C1, and the torque converter TC, an end portion support wall 5 covering the side in the axial first direction A1 of the rotary electric machine MG and the input clutch C1, and an intermediate support wall 6 covering the side in the axial second direction A2 of the torque converter TC. The rotary electric machine MG the input clutch C1, and the torque converter TC are housed in a space in the case 3 between the end portion support wall 5 and the intermediate support wall 6. Although not shown, the speed change mechanism TM is housed in a space on the side in the axial second direction A2 relative to the intermediate support wall 6. Note that the first damper 16 is arranged in a space outside of the case 3 on the side in the axial first direction A1 relative to the end portion support wall 5.

The end portion support wall 5 has a shape that extends at least radially. Here, the end portion support wall 5 is a wall portion of a generally disc shape extending radially and circumferentially. In the present embodiment, the end portion support wall 5 corresponds to a "support wall" in the present invention. A radially central portion of the end portion support wall 5 is provided with a cylindrical projecting portion 11. The cylindrical projecting portion 11 is a projecting portion of a cylindrical shape that is coaxially arranged with respect to the center axis X and formed so as to project from the end portion support wall 5 toward the axial second direction A2. The cylindrical projecting portion 11 is provided as a unit with the end portion support wall 5. The cylindrical projecting portion 11 has a certain amount of axial length. In the example shown, the cylindrical projecting portion 11 has an axial length larger than an axial length of the rotor Ro. A radially central portion of the cylindrical projecting portion 11 is formed with a center axis through hole 11a (refer to FIG. 3, etc.) penetrating in the axial direction. Then, the input shaft I is inserted through the center axis through hole 11a. Accordingly, the input shaft I is arranged so as to penetrate through the radially inside of the cylindrical projecting portion 11, thus being inserted in the case 3 through the end portion support wall 5.

As shown in FIG. 3, etc., in the present embodiment, a first step portion 11b is provided in a predetermined axial position on the outer circumferential face of the cylindrical projecting portion 11. With the first step portion 11b as a border, the outer circumferential face of the cylindrical projecting portion 11 is formed as a large-diameter portion on the side in the axial first direction A1 relative to the first step portion 11b, and formed as a small-diameter portion on the side in the axial second direction A2 relative to the first step portion 11b. Then, a first bearing 71 is arranged so as to be in contact with the outer circumferential face of the small-diameter portion. As the first bearing 71, a bearing capable of receiving a radial load is used. In the present example, a ball bearing is used. In the present embodiment, the first bearing 71 corresponds to a "support bearing" in the present invention. Note that the first step portion 11b is provided in an axial position slightly on the side in the axial first direction A1 relative to an inner circumferential step portion 25b of a support cylindrical portion 25 to be described later.

On the outer circumferential face of the cylindrical projecting portion 11, a second step portion 11c is provided in a predetermined position on the side in the axial second direction A2 relative to the first step portion 11b. With the second step portion 11c as a border, the outer circumferential face of the cylindrical projecting portion 11 is formed in a further reduced diameter on the side in the axial second direction A2 relative to the second step portion 11c. A sleeve 86 is fitted in contact with the outer circumferential face of an end portion on the side in the axial second direction A2 of the cylindrical projecting portion 11 formed into a smaller diameter than that of the small-diameter portion in this manner. The outer diameter of the sleeve 86 coincides with the outer diameter of the small-diameter portion of the cylindrical projecting portion 11.

In the present embodiment, the cylindrical projecting portion 11 is formed with a plurality of oil passages. Specifically, as shown in FIGS. 3 and 4, the cylindrical projecting portion 11 is formed with four oil passages of a first oil passage L1, a second oil passage L2, a third oil passage L3, and a fourth oil passage L4. The first oil passage L1 is an oil supply passage that communicates with an operating oil pressure chamber H1 (to be described later) of the input clutch C1 for supplying oil to the operating oil pressure chamber H1 (refer to FIG. 4). The second oil passage L2 is an oil supply passage that communicates with a circulating oil pressure chamber H2 (to be described later) of the input clutch C1 for supplying oil to the circulating oil pressure chamber H2 (refer to FIG. 3). The third oil passage L3 is an oil discharge passage for returning the oil discharged from the circulating oil pressure chamber H2 to an oil pan (not shown) (refer to FIG. 3). The fourth oil passage L4 is an oil discharge passage for returning the oil discharged from a bearing arrangement space P (to be described later) to the oil pan (not shown) (refer to FIG. 4). Details of these oil passages will be described later.

The intermediate support wall 6 has a shape that extends at least radially. Here, the intermediate support wall 6 is a wall portion of a flat disc shape extending radially and circumferentially. In the present embodiment, the intermediate support wall 6 is structured as a separate member from the end portion support wall 5. The intermediate support wall 6 is also structured as a separate member from the circumferential wall 4, and fastened to a step portion provided on the inner circumferential face of the circumferential wall 4 by fastening members such as bolts. The intermediate support wall 6 is provided with an oil pump 9. Here, a pump cover 7 is mounted on a surface on the side in the axial first direction A1 of the intermediate support wall 6, and a pump rotor is housed in a pump chamber formed between the intermediate support wall 6 and the pump cover 7. A radially central portion of the intermediate support wall 6 and the pump cover 7 is formed with an axially penetrating through hole, through which the intermediate shaft M is inserted. A fixed shaft 58 and a pump drive shaft 47 are also inserted through this through hole. The fixed shaft 58 is a shaft portion of a cylindrical shape that is fixed to the intermediate support wall 6 and supports the stator 56 of the torque converter TC. The fixed shaft 58 is coaxially arranged with respect to the center axis X, on the radially outside of the intermediate shaft M. The pump drive shaft 47 is a shaft portion of a cylindrical shape that rotates as a unit with the pump impeller 41 of the torque converter TC. The pump drive shaft 47 is coaxially arranged with respect to the center axis X, on the radially outside of the fixed shaft 58.

In the present embodiment, the oil pump 9 is an internal gear pump having a pump rotor constituted of an inner rotor and an outer rotor. The pump rotor of the oil pump 9 is drivingly connected so as to rotate as a unit with the pump impeller 41 via the pump drive shaft 47. Consequently, the oil pump 9 discharges oil in accordance with the rotation of the pump impeller 41, thereby generating hydraulic pressure for supplying the oil to various parts of the drive device 1. The intermediate support wall 6 and the pump cover 7 are formed with a suction oil passage and a discharge oil passage of the oil pump 9. As partially shown in FIG. 2, etc., oil passages for oil supply such as described above are provided inside the case 3 (including the end portion support wall 5 and the cylindrical projecting portion 11) and various shafts of the drive device 1.

2-2. Rotary Electric Machine

As shown in FIG. 2, the rotary electric machine MG is arranged in a position on the side in the axial second direction A2 relative to the end portion support wall 5 and on the side in the axial first direction A1 relative to the torque converter TC. The rotary electric machine MG is also arranged on the radially outside of the input shaft I and the input clutch C1. The rotary electric machine MG and the input clutch C1 are arranged in positions having portions overlapping with each other when viewed radially. The stator St of the rotary electric machine MG is fixed to the case 3. The rotor Ro is arranged on the radially inside of the stator St. The rotor Ro is arranged in a manner opposed to the stator St with a small space radially provided therebetween, and is supported in a rotatable state by the case 3. Specifically, a rotor support member 22 supporting the rotor Ro so as to rotate as a unit therewith is supported in a rotatable manner relative to the cylindrical projecting portion 11 of the case 3 via the first bearing 71. In the present embodiment, the rotor Ro corresponds to a "rotor body" in the present invention.

As shown in FIGS. 2 to 4, the rotor support member 22 is a member that supports the rotor Ro of the rotary electric machine MG from the radially inside. The rotor support member 22 is arranged on the side in the axial first direction A1 relative to the input clutch C1. The rotor support member 22 is formed in a shape that extends at least radially, so as to support the rotor Ro against the first bearing 71 arranged on the radially inside of the rotor Ro. In the present embodiment, the rotor support member 22 is provided with a rotor holding portion 23, a radially extending portion 24, and the support cylindrical portion 25.

The rotor holding portion 23 is a portion that holds the rotor Ro. The rotor holding portion 23 is coaxially arranged with respect to the center axis X, and formed in a circular ring shape in contact with the inner circumferential face and both axial side faces of the rotor Ro. The radially extending portion 24 is formed, as a unit with the rotor holding portion 23, so as to extend radially inward from near the axially central portion of the rotor holding portion 23. In the present example, the radially extending portion 24 is an annular plate-shaped portion extending radially and circumferentially. In the present example, the radially extending portion 24 has a flat plate shape with an almost uniform thickness regardless of radial or circumferential position. A plurality of circumferential locations of the radially extending portion 24 are provided with first bolt insert holes 24a. First bolts 91 are inserted through the first bolt insert holes 24a for fastening the rotor support member 22 with a cylindrical connecting member 32. In the present embodiment, a radially inside end portion of the radially extending portion 24 is provided with the support cylindrical portion 25 in an integrated manner.

The support cylindrical portion 25 is a cylindrical portion that is coaxially arranged with respect to the center axis X, and formed so as to extend toward both axial sides relative to the radially extending portion 24. In the present embodiment, the first bearing 71 is arranged on the inner circumferential face of the support cylindrical portion 25, and the rotor support member 22 is supported by the first bearing 71 that is arranged between the inner circumferential face of the support cylindrical portion 25 and the outer circumferential face of the cylindrical projecting portion 11. The rotor support member 22 is thus supported on the outer circumferential face of the cylindrical projecting portion 11 in a rotatable state via the first bearing 71.

The inner circumferential step portion 25b is provided in a predetermined axial position on the inner circumferential face of the support cylindrical portion 25. Regarding the inner circumferential step portion 25b as a border, the inner circumferential face of the support cylindrical portion 25 is formed as an inner circumferential small-diameter portion on the side in the axial first direction A1 relative to the inner circumferential step portion 25b, and formed as an inner circumferential large-diameter portion on the side in the axial second direction A2 relative to the inner circumferential step portion 25b. Then, the first bearing 71 is arranged so as to be in contact with the inner circumferential face of the inner circumferential large-diameter portion and with a side face on the side in the axial second direction A2 of the inner circumferential step portion 25b. Note that, in the present embodiment, the inner circumferential step portion 25b is provided on the side in the axial first direction A1 relative to the radially extending portion 24. The first bearing 71 is arranged in a position having a portion overlapping with the radially extending portion 24 when viewed radially.

On the outer circumferential face of the support cylindrical portion 25, an outer circumferential step portion 25c is provided in a predetermined position on the side in the axial first direction A1 relative to the radially extending portion 24. With the outer circumferential step portion 25c as a border, the outer circumferential face of the support cylindrical portion 25 is formed as an outer circumferential small-diameter portion on the side in the axial first direction A1 relative to the outer circumferential step portion 25c, and formed as an outer circumferential large-diameter portion on the side in the axial second direction A2 relative to the outer circumferential step portion 25c. Note that the outer circumferential step portion 25c is provided on the side in the axial first direction A1 relative to the inner circumferential step portion 25b. The support cylindrical portion 25 is provided as a unit with the radially extending portion 24 at the outer circumferential large-diameter portion. Furthermore, a sensor rotor 13b of a rotation sensor 13 is mounted so as to be in contact with the outer circumferential face of the outer circumferential small-diameter portion and with a side face on the side in the axial first direction A1 of the outer circumferential step portion 25c. As shown in FIG. 2, on the radially outside of the sensor rotor 13b, a sensor stator 13a is arranged in a manner opposed to the sensor rotor 13b with a small space radially provided therebetween. The sensor stator 13a is fixed to a predetermined sensor stator mounting portion provided on the end portion support wall 5. Note that the rotation sensor 13 is a sensor for detecting a rotational position of the rotor Ro relative to the stator St of the rotary electric machine MG, and the present example uses a resolver for the rotation sensor 13.

In the present embodiment, a cylindrical portion of the support cylindrical portion 25 located on the side in the axial second direction A2 relative to the radially extending portion 24 serves as a fitting projecting portion 25a. That is, the rotor support member 22 has the cylindrical fitting projecting portion 25a projecting from the radially extending portion 24 toward the axial second direction A2. The fitting projecting portion 25a axially extends at least by a required fitting length. As will be described later, a cylindrical extending portion 32d of the cylindrical connecting member 32 is fitted onto the fitting projecting portion 25a while being radially in contact therewith.

In the present embodiment, a first seal member 81 is arranged between the rotor support member 22 and the cylindrical projecting portion 11, on the side in the axial first direction A1 relative to the first bearing 71. Here, the first seal member 81 is arranged between the inner circumferential small-diameter portion of the support cylindrical portion 25 and the large-diameter portion of the cylindrical projecting portion 11. The first seal member 81 seals between the support cylindrical portion 25 and the cylindrical projecting portion 11, thereby suppressing the oil after, for example, lubricating the first bearing 71 from reaching the rotation sensor 13, the stator St of the rotary electric machine MG, or the like. Note that the first bearing 71 is arranged in a space defined by the outer circumferential face of the cylindrical projecting portion 11, the inner circumferential face of the support cylindrical portion 25, and the first seal member 81, and this space is a "bearing arrangement space P" in the present embodiment. In the present embodiment, a "third seal portion" in the present invention is constituted by the portion where the first seal member 81 is arranged between the rotor support member 22 and the cylindrical projecting portion 11.

2-3. Input Clutch

The input clutch C1 is a friction engagement device that selectively drivingly connects the input shaft I with the rotary electric machine MG and the torque converter TC. The input clutch C1 is structured as a wet-type multi-plate clutch mechanism. As shown in FIG. 2, the input clutch C1 is arranged between the rotor support member 22 and the torque converter TC in the axial direction. That is, the input clutch C1 is arranged in a position on the side in the axial second direction A2 relative to the rotor support member 22 and on the side in the axial first direction A1 relative to the torque converter TC. The input clutch C1 is arranged axially adjacent to the torque converter TC. The input clutch C1 is also arranged between the cylindrical projecting portion 11 and the rotor Ro of the rotary electric machine MG in the radial direction. That is, the input clutch C1 is arranged on the radially outside relative to the cylindrical projecting portion 11 and the radially inside relative to the rotor Ro. The cylindrical projecting portion 11, the input clutch C1, and the rotor Ro are arranged so as to have portions overlapping with each other when viewed radially. The input clutch C1 is provided with a clutch hub 31, the cylindrical connecting member 32, friction members 33, a piston 34, and the operating oil pressure chamber H1.

The input clutch C1 has, as the friction members 33, an input-side friction member and an output-side friction member, serving as a pair. Here, the input clutch C1 has a plurality (two, in the present example) of such input-side friction members and a plurality (two, in the present example) of such output-side friction members, and these members are axially alternately arranged. Each of the plurality of friction members 33 is formed in an annular plate shape. In the present embodiment, the friction members 33 correspond to an "engagement member" in the present invention.

The clutch hub 31 is an annular plate-shaped member radially extending so as to support the plurality of input-side friction members (hub-side friction members, in the present example) from the radially inside. The clutch hub 31 is provided so as to radially extend by passing through between the piston 34 and a cover portion 42 (to be described later) of the torque converter TC in the axial direction, and a radially inside end portion of the clutch hub 31 is connected to the input shaft I. Here, the input shaft I has a flange portion Ia extending radially outward by passing through between the cylindrical projecting portion 11 and the cover portion 42 in the axial direction. A radially outside end portion of the flange portion Ia is connected with the radially inside end portion of the clutch hub 31 by joining through welding or the like. The input shaft I and the clutch hub 31 are thus connected so as to rotate as a unit with each other. An "input transmission member" is constituted by the input shaft I and the clutch hub 31. Note that the clutch hub 31 is a member to which the rotation and the torque of the internal combustion engine E are transmitted via the input shaft I, and serves as an input-side rotational member of the input clutch C1. In the present embodiment, the clutch hub 31 corresponds to an "engagement input side member" in the present invention.

The cylindrical connecting member 32 is a generally cylindrical member provided so as to cover at least the radially outside of the plurality of friction members 33 and also to support the output-side friction members (drum-side friction members, in the present example) from the radially outside. The cylindrical connecting member 32 is structured so as to function as a clutch drum of the input clutch C1. Furthermore, the cylindrical connecting member 32 has a portion formed in a bowl shape as a whole so as to further cover the side in the axial first direction A1 of the piston 34 and the radially outside of the piston 34. In the present embodiment, the cylindrical connecting member 32 is structured as a separate member independent of the rotor support member 22 and the cover portion 42 of the torque converter TC. Then, the cylindrical connecting member 32 is connected to the rotor support member 22 and to the cover portion 42. The cylindrical connecting member 32 is an output-side rotational member of the input clutch C1 that is paired with the clutch hub 31 to transmit, in the engaged state of the input clutch C1, rotation and torque introduced to the clutch hub 31 to the torque converter TC provided on the side of the output shaft O. In the present embodiment, the cylindrical connecting member 32 corresponds to an "engagement output side member" in the present invention.

As shown in FIGS. 3 and 4, the cylindrical connecting member 32 serving as a clutch drum is provided with an axially extending portion 32a, a radially extending portion 32b, the cylindrical extending portion 32d, a cylindrical projecting portion 32e, and a radial extension portion 32f. The axially extending portion 32a is coaxially arranged with respect to the center axis X, and formed in a cylindrical shape so as to extend outward over a predetermined axial range. The axially extending portion 32a is provided along the axial direction so as to be in contact with the radially extending portion 24 of the rotor support member 22 at least on the side in the axial first direction A1, and with the cover portion 42 of the torque converter TC on the side in the axial second direction A2. As will be described later, the cover portion 42 is fitted onto the axially extending portion 32a while being radially in contact therewith. Furthermore, the axially extending portion 32a is arranged in a manner opposed to the rotor holding portion 23 of the rotor support member 22 with a predetermined space radially provided therebetween. In the present embodiment, the axially extending portion 32a corresponds to an "axial extension portion" in the present invention.

The radial extension portion 32f is provided as a unit with the axially extending portion 32a, and formed in an annular plate shape so as to extend radially outward from an end portion on the side in the axial second direction A2 of the axially extending portion 32a. A plurality of circumferential locations of the radial extension portion 32f are provided with second bolt insert holes 32g. Second bolts 92 are inserted through the second bolt insert holes 32g for fastening the cover portion 42 with the cylindrical connecting member 32. The radial extension portion 32f is arranged in a position that is located on the radially inside of a coil end portion Ce on the side in the axial second direction A2 of the stator St and that has a portion overlapping with the coil end portion Ce when viewed radially. The radial extension portion 32f is also arranged in a position that is located on the side in the axial second direction A2 of the rotor Ro and that has a portion overlapping with the rotor Ro when viewed axially.

The radially extending portion 32b is provided as a unit with the axially extending portion 32a, and formed in a generally annular plate shape so as to extend radially inward from an end portion on the side in the axial first direction A1 of the axially extending portion 32a. A junction between the axially extending portion 32a and the radially extending portion 32b is provided as a thick-walled portion having predetermined thickness in the axial and radial directions, and the thick-walled portion serves as a mounting portion 32c for assembling the cylindrical connecting member 32 with the rotor support member 22. A plurality of circumferential locations of the mounting portion 32c are provided with first bolt holes into which the first bolts 91 are tightened. The radially extending portion 32b has also the cylindrical extending portion 32d that is structured as a unit with the radially extending portion 32b so as to axially extend on the radially inside relative to the mounting portion 32c. That is, the radially extending portion 32b is formed so as to have a shape in which the radially inside portion relative to the cylindrical extending portion 32d is offset in the axial second direction A2 from the radially outside portion. The cylindrical extending portion 32d is fitted onto the fitting projecting portion 25a of the rotor support member 22 while being radially in contact therewith.

The cylindrical projecting portion 32e is provided as a unit with the radially extending portion 32b, and formed in a cylindrical shape so as to project at least toward the axial second direction A2 from a radially inside end portion of the radially extending portion 32b. In the present example, the cylindrical projecting portion 32e extends toward both axial sides relative to the radially extending portion 32b. The cylindrical projecting portion 32e is arranged in a position that is located on the radially inside of the friction members 33 and that has a portion overlapping with the friction members 33 when viewed radially. The cylindrical projecting portion 32e is also arranged on the radially outside of the end portion on the side in the axial second direction A2 of the cylindrical projecting portion 11 of the case 3, in a manner radially opposed to the cylindrical projecting portion 11 with a predetermined space provided therebetween. Then, the sleeve 86 is arranged between the cylindrical projecting portion 32e and the cylindrical projecting portion 11 of the case 3. That is, the sleeve 86 is arranged so as to be in contact with the inner circumferential face of the cylindrical projecting portion 32e and the outer circumferential face of the cylindrical projecting portion 11 of the case 3. Note that, in the present embodiment, the case 3 including the cylindrical projecting portion 11 is made of aluminum, and the cylindrical connecting member 32 including the cylindrical projecting portion 32e is made of iron. Therefore, the sleeve 86 is made of iron for the purpose of suppressing wear of the cylindrical projecting portion 11 caused by relative rotation between the cylindrical projecting portion 11 of the case 3 and the cylindrical projecting portion 32e of the cylindrical connecting member 32.

The piston 34 that presses the friction members 33 along the pressing direction to operate the friction members 33 is arranged so as to be slidable along the axial direction relative to the outer circumferential faces of the cylindrical extending portion 32d and the cylindrical projecting portion 32e. In the present embodiment, the piston 34 corresponds to a "pressing member" in the present invention. In the present embodiment, the piston 34 is arranged so as to press the friction members 33 from the axial first direction A1. In the present example, the axial second direction A2 corresponds to the "pressing direction" mentioned above. Seal members such as O-rings are arranged between the cylindrical extending portion 32d and the piston 34, and between the cylindrical projecting portion 32e and the piston 34. The operating oil pressure chamber H1 is thus formed as a space defined and sealed by the radially extending portion 32b, the cylindrical extending portion 32d, the cylindrical projecting portion 32e, and the piston 34. The operating oil pressure chamber H1 is supplied with oil for operating the piston 34 via the first oil passage L1.

The circulating oil pressure chamber H2 is formed on the side of the piston 34 opposite to the operating oil pressure chamber H1 (here, on the side in the axial second direction A2 of the piston 34). That is, the circulating oil pressure chamber H2 is formed so as to apply a hydraulic pressure to the side (side in the axial second direction A2, in the present example) opposite to the side (side in the axial first direction A1, that is, the side of the internal combustion engine E, in the present example) to which a hydraulic pressure for operating the piston 34 is applied with the oil supplied. The circulating oil pressure chamber H2 is formed as a space defined mainly by the piston 34, the axially extending portion 32a, the cover portion 42 of the torque converter TC, the cylindrical projecting portion 11, and the above-mentioned input transmission members (input shaft I and clutch hub 31). The circulating oil pressure chamber H2 is thus arranged between the operating oil pressure chamber H1 and the cover portion 42 of the torque converter TC in the axial direction. Here, in the present embodiment, a second seal member 82 is arranged between the cylindrical projecting portion 11 and the input shaft I constituting the input transmission member so as to seal therebetween. A fourth seal member 84 is arranged between the axially extending portion 32a and the cover portion 42 so as to seal therebetween. The circulating oil pressure chamber H2 is thus formed as a sealed space. In the present embodiment, the fourth seal member 84 corresponds to a "seal member" in the present invention. A "first seal portion" in the present invention is constituted by the portion where the axially extending portion 32a and the cover portion 42 are fitted to each other via the fourth seal member 84. Furthermore, a "second seal portion" in the present invention is constituted by the portion where the second seal member 82 is arranged between the cylindrical projecting portion 11 and the input shaft I.

The circulating oil pressure chamber H2 is supplied, via the second oil passage L2, with pressurized oil that is discharged by the oil pump 9 and regulated to a predetermined pressure level by a hydraulic pressure control device (not shown). By being supplied with the oil via the second oil passage L2, the circulating oil pressure chamber H2 is basically placed in a state of being filled with oil at a predetermined pressure or more. In the present embodiment, the hydraulic pressure supplied to the circulating oil pressure chamber H2 via the second oil passage L2 is applied to the piston 34 on the side opposite to the side to which the hydraulic pressure (hydraulic pressure for operating the piston 34) supplied to the operating oil pressure chamber H1 is applied. Furthermore, the hydraulic pressure supplied to the circulating oil pressure chamber H2 is regulated to be different from the hydraulic pressure supplied to the operating oil pressure chamber H1. Accordingly, engagement and disengagement of the input clutch C1 can be controlled by sliding the piston 34 along the axial direction in response to a differential pressure between the hydraulic pressure applied from the operating oil pressure chamber H1 located on the side in the axial first direction A1 relative to the piston 34 and the hydraulic pressure applied from the circulating oil pressure chamber H2 located on the side in the axial second direction A2 relative to the piston 34. That is, by reducing the hydraulic pressure supplied to the operating oil pressure chamber H1 to be lower than the hydraulic pressure supplied to the circulating oil pressure chamber H2, the piston 34 can be moved in the axial first direction A1 so as to place the input clutch C1 in the disengaged state. On the other hand, by increasing the hydraulic pressure supplied to the operating oil pressure chamber H1 to be higher than the hydraulic pressure supplied to the circulating oil pressure chamber H2, the piston 34 can be moved in the axial second direction A2 to frictionally engage the friction members 33 with each other so as to place the input clutch C1 in the engaged state. In the present embodiment, the circulating oil pressure chamber H2 corresponds to a "differential pressure generating chamber" in the present invention.

The end portion on the side in the axial second direction A2 of the cylindrical projecting portion 11 is arranged in the circulating oil pressure chamber H2. Also, the flange portion Ia of the input shaft I inserted through the radially inside of the cylindrical projecting portion 11 is arranged in the circulating oil pressure chamber H2 so as to extend radially outward on the side in the axial second direction A2 of the cylindrical projecting portion 11. Moreover, the clutch hub 31 connected to the flange portion Ia is arranged so as to radially extend in the circulating oil pressure chamber H2, in which the plurality of friction members 33 are also arranged. In the present embodiment, the plurality of friction members 33 can be cooled efficiently by the oil filled in the circulating oil pressure chamber H2.

2-4. Torque Converter

As shown in FIG. 2, the torque converter TC is arranged in a position on the side in the axial second direction A2 relative to the rotary electric machine MG and the input clutch C1, and on the side in the axial first direction A1 relative to the intermediate support wall 6 and the speed change mechanism TM. The torque converter TC is arranged axially adjacent to the input clutch C1. The torque converter TC is provided with the pump impeller 41, the turbine runner 51, the stator 56, and the cover portion 42 housing these parts.

The cover portion 42 is structured so as to rotate as a unit with the pump impeller 41. Here, the pump impeller 41 is provided inside the cover portion 42 in an integrated manner. The cover portion 42 is also connected to the cylindrical connecting member 32. The cover portion 42 is thus drivingly connected so as to rotate as a unit with the rotor Ro of the rotary electric machine MG via the cylindrical connecting member 32 and the rotor support member 22. Accordingly, the pump impeller 41 and the cover portion 42 are members to which the rotation and the torque of one or both of the internal combustion engine E and the rotary electric machine MG are transmitted, and are input-side rotational members of the torque converter TC. The cover portion 42 is also connected to the pump drive shaft 47. The cover portion 42 is drivingly connected so as to rotate as a unit with the pump rotor of the oil pump 9 via the pump drive shaft 47. The pump drive shaft 47 is radially supported by the pump cover 7 in a rotatable state via a second bearing 72 provided in the through hole of the pump cover 7.

The turbine runner 51 is arranged on the side in the axial first direction A1 of the pump impeller 41 in a manner opposed to the pump impeller 41. The turbine runner 51 is an output-side rotational member of the torque converter TC that is paired with the pump impeller 41 to transmit the rotation and the torque input to the pump impeller 41 to the intermediate shaft M provided on the side of the output shaft O. The turbine runner 51 has a radially extending portion 52. The radially extending portion 52 is arranged between a cylindrical extending portion 46 (refer to FIG. 3, etc.) to be described later and a one-way clutch 57 in the axial direction. Furthermore, the turbine runner 51 has a cylindrical projecting portion 53 (refer to FIG. 3) that is provided as a unit with the radially extending portion 52 and projects toward the axial first direction A1 from a radially inside end portion of the radially extending portion 52. In the present embodiment, the cylindrical projecting portion 53 is connected via splines with the intermediate shaft M arranged so as to penetrate through the cylindrical projecting portion 53.

The stator 56 is arranged between the pump impeller 41 and the turbine runner 51 in the axial direction. The stator 56 is supported by the fixed shaft 58 via the one-way clutch 57. As described above, the fixed shaft 58 is a shaft portion of a cylindrical shape that is fixed, on the side in the axial second direction A2 thereof, to the intermediate support wall 6 of the case 3. Accordingly, the stator 56 is connected to the intermediate support wall 6 via the one-way clutch 57 and the fixed shaft 58. The one-way clutch 57 is arranged between the radially extending portion 52 and the pump drive shaft 47 in the axial direction.

In the present embodiment, a body portion of the torque converter TC is constituted by the pump impeller 41 and the turbine runner 51 arranged in a manner opposed to each other. Furthermore, the cover portion 42 holding the pump impeller 41 from outside is arranged so as to house also the turbine runner 51. That is, the cover portion 42 is arranged so as to house the body portion of the torque converter TC. In the present embodiment, the cover portion 42 also houses therein the lock-up clutch C2 and a second damper 54 arranged on the side in the axial first direction A1 relative to the body portion of the torque converter TC. In the present embodiment, the space in the cover portion 42 housing these parts such as the body portion is referred to as a "body portion housing chamber H4". The body portion housing chamber H4 is supplied with oil via a sixth oil passage L6 formed inside the intermediate shaft M. Torque transmission between the pump impeller 41 and the turbine runner 51 can be effected via the oil in the body portion housing chamber H4. In the present embodiment, the sixth oil passage L6 corresponds to a "coupling supply oil passage" in the present invention.

The cover portion 42 is provided so as to cover both axial sides and the radially outside relative to the body portion, the lock-up clutch C2, and the second damper 54. Therefore, as shown in FIGS. 3 and 4, the cover portion 42 has an outer radially extending portion 43, an axially extending portion 44, an inner radially extending portion 45, and the cylindrical extending portion 46, on the side in the axial first direction A1 relative to the body portion.

The axially extending portion 44 is a cylindrical portion extending along the axial direction over a predetermined range. The axially extending portion 44 is provided in an approximately intermediate position in an area radially occupied by a portion of the cover portion 42 located on the side in the axial first direction A1 relative to the body portion. The axially extending portion 44 is fitted onto the axially extending portion 32a of the cylindrical connecting member 32 while being radially in contact therewith. The outer radially extending portion 43 is provided as a unit with the axially extending portion 44, and formed in an annular plate shape so as to extend radially outward from an end portion on the side in the axial second direction A2 of the axially extending portion 44. The outer radially extending portion 43 is arranged so as to radially extend by passing through between the rotary electric machine MG and the second damper 54 in the axial direction. The inner radially extending portion 45 is provided as a unit with the axially extending portion 44, and formed in a generally disc shape so as to extend radially inward from an end portion of the axially extending portion 44 on the side in the axial first direction A1. The inner radially extending portion 45 is arranged so as to radially extend by passing through between the input clutch C1 and the lock-up clutch C2 in the axial direction. A radially center portion of the inner radially extending portion 45 is arranged between the input shaft I and the intermediate shaft M in the axial direction. Note that the cover portion 42 is formed in a stepped bowl shape as a whole by a cylindrical portion covering the radially outside of the second damper 54, the outer radially extending portion 43, the axially extending portion 44, and the inner radially extending portion 45. In the present embodiment, the outer radially extending portion 43 corresponds to a "radially extending portion" in the present invention.

The cylindrical extending portion 46 is structured as a unit with the inner radially extending portion 45, and formed in a cylindrical shape so as to extend toward the axial second direction A2 from the radially center portion of the inner radially extending portion 45. In the present embodiment, a step portion 46a is provided in a predetermined axial position on the inner circumferential face of the cylindrical extending portion 46. With the step portion 46a as a border, the inner circumferential face of the cylindrical extending portion 46 is formed as a small-diameter portion on the side in the axial first direction A1 relative to the step portion 46a, and formed as a large-diameter portion on the side in the axial second direction A2 relative to the step portion 46a. Then, an end portion on the side in the axial first direction A1 of the intermediate shaft M is arranged on the radially inside of the small-diameter portion. Furthermore, the cylindrical projecting portion 53 of the turbine runner 51 is arranged in a position on the radially inside of the large-diameter portion and on the radially outside of the intermediate shaft M. The cylindrical extending portion 46 is arranged on the side in the axial first direction A1 relative to the one-way clutch 57 and the radially extending portion 52 of the turbine runner 51.

The lock-up clutch C2 is a friction engagement device that selectively drivingly connects the pump impeller 41 rotating as a unit with the cover portion 42 and the turbine runner 51. The lock-up clutch C2 is structured as a wet-type multi-plate clutch mechanism. The lock-up clutch C2 is arranged in a position that is located on the radially inside of the axially extending portion 44 of the cover portion 42 and that has a portion overlapping with the axially extending portion 44 when viewed radially. The lock-up clutch C2 is also arranged on the side in the axial first direction A1 relative to the turbine runner 51. Moreover, the lock-up clutch C2 is arranged adjacent in the axial second direction A2 to the input clutch C1 with the inner radially extending portion 45 of the cover portion 42 in between. As shown in FIGS. 3 and 4, the lock-up clutch C2 is provided with a clutch hub 61, a clutch drum 62, friction members 63, a piston 64, and an operating oil pressure chamber H3.

The clutch hub 61 is provided so as to rotate as a unit with the cylindrical extending portion 46 constituting the cover portion 42. The clutch drum 62 is drivingly connected to the turbine runner 51 and the intermediate shaft M via the second damper 54. A plurality of such friction members 63 are arranged between the clutch hub 61 and the clutch drum 62, and the piston 64 is arranged on the side in the axial first direction A1 relative to the friction members 63. The piston 64 is also arranged so as to be slidable along the axial direction relative to the axially extending portion 44 and the cylindrical extending portion 46 constituting the cover portion 42. Seal members such as O-rings are arranged between the axially extending portion 44 and the piston 64, and between the cylindrical extending portion 46 and the piston 64. The operating oil pressure chamber H3 is thus formed as a space defined and sealed by the axially extending portion 44, the inner radially extending portion 45, the cylindrical extending portion 46, and the piston 64. The operating oil pressure chamber H3 is supplied with oil for operating the piston 64 via a seventh oil passage L7 formed inside the intermediate shaft M.

In the present embodiment, the piston 64 of the lock-up clutch C2 is arranged on the radially inside of the axially extending portion 44 fitted onto the axially extending portion 32a of the cylindrical connecting member 32 while being radially in contact therewith. The axially extending portion 32a, the fourth seal member 84, the axially extending portion 44, the piston 64, and the seal members between the axially extending portion 44 and the piston 64 are arranged in positions having portions overlapping with each other when viewed radially. The axial length of the entire device is intended to be reduced accordingly. Furthermore, a structure (second radially fitting portion J2 to be described later) for mutually positioning the cylindrical connecting member 32 and the cover portion 42 in the radial direction is shared with the structure for sealing the operating oil pressure chamber H2 of the lock-up clutch C2.

In the present embodiment, the hydraulic pressure supplied to the body portion housing chamber H4 is regulated to be different from the hydraulic pressure (hydraulic pressure for operating the piston 64) supplied to the operating oil pressure chamber H3. Engagement and disengagement of the lock-up clutch C2 can be thus controlled by sliding the piston 64 along the axial direction in response to a differential pressure between the hydraulic pressure applied from the operating oil pressure chamber H3 located on the side in the axial first direction A1 relative to the piston 64 and the hydraulic pressure applied from the body portion housing chamber H4 located on the side in the axial second direction A2 relative to the piston 64. Note that, in the present embodiment, the body portion housing chamber H4 and the circulating oil pressure chamber H2 are formed as spaces independent of each other.

2-5. Power Transmission Member

The power transmission member T is a member that transmits the rotation and the torque from the source of vehicle driving force to the speed change mechanism TM. In the present embodiment, the rotation and the torque from the source of vehicle driving force are transmitted to the pump impeller 41 of the torque converter TC, and thereby transmitted to the speed change mechanism TM via the torque converter TC. Therefore, the power transmission member T according to the present embodiment is structured such that the rotor support member 22, the cylindrical connecting member 32 serving as an output-side rotational member of the input clutch C1, and the cover portion 42 of the torque converter TC are connected so as to rotate as a unit with each other.

The rotor support member 22 is connected with the cylindrical connecting member 32 by being in contact therewith at least at two locations, that is, at a first radially fitting portion J1 and a first fastening portion F1, in the present example. The first radially fitting portion J1 is a portion for mutually positioning the rotor support member 22 and the cylindrical connecting member 32 in the radial direction. In the present embodiment, each of the fitting projecting portion 25a provided in the rotor support member 22 and the cylindrical extending portion 32d provided in the cylindrical connecting member 32 has an axially extending portion. Then, in the present example, the outer circumferential face of the fitting projecting portion 25a and the inner circumferential face of the cylindrical extending portion 32d are mutually fitted while being in contact with each other over the entire circumference thereof, and thereby, the rotor support member 22 and the cylindrical connecting member 32 are mutually positioned in the radial direction. In this manner, in the present embodiment, the first radially fitting portion J1 is structured by the fitting projecting portion 25a of the rotor support member 22 and the cylindrical extending portion 32d of the cylindrical connecting member 32. Note that, in the present embodiment, a third seal member 83 such as an O-ring is further arranged between the fitting projecting portion 25a and the cylindrical extending portion 32d constituting the first radially fitting portion J1. The structure (the first radially fitting portion J1) for mutually positioning the rotor support member 22 and the cylindrical connecting member 32 in the radial direction is shared with the structure for suppressing the oil from flowing out to the side of the stator St of the rotary electric machine MG by sealing the bearing arrangement space P.

The first fastening portion F1 is a portion for fastening the rotor support member 22 with the cylindrical connecting member 32. In the present embodiment, the radially extending portion 24 of the rotor support member 22 and the mounting portion 32c of the cylindrical connecting member 32 are arranged in contact with each other in the axial direction. These portions are arranged in the state in which all center axes of the plurality of first bolt insert holes 24a provided in the radially extending portion 24 coincide with all center axes of the plurality of first bolt holes provided in the mounting portion 32c. The first bolts 91 are inserted through the respective first bolt insert holes 24a to be tightened to the first bolt holes. The radially extending portion 24 and the mounting portion 32c are thus fastened with each other by the first bolts 91, thus constituting the first fastening portion F1 by the fastening portions between the radially extending portion 24 and the mounting portion 32c. Then, the rotor support member 22 and the cylindrical connecting member 32 are tightly fixed to each other without looseness by the first fastening portion F1. Note that, in the present example, the first bolts 91, the first bolt insert holes 24a, and the first bolt holes are arranged so as to be circumferentially distributed in a plurality of sets thereof. Therefore, the term "first fastening portion F1" is used as a collective term for the plurality of sets (the same applies to a second fastening portion F2 to be described later).

The cylindrical connecting member 32 is connected with the cover portion 42 by being in contact therewith at least at two locations, that is, at the second radially fitting portion J2 and the second fastening portion F2. The second radially fitting portion J2 is a portion for mutually positioning the cylindrical connecting member 32 and the cover portion 42 in the radial direction. In the present embodiment, each of the axially extending portion 32a provided in the cylindrical connecting member 32 and the axially extending portion 44 provided in the cover portion 42 has an axially extending portion. Then, in the present example, at an open end portion on the side in the axial second direction A2 of the axially extending portion 32a, the inner circumferential face of the axially extending portion 32a and the outer circumferential face of the axially extending portion 44 are mutually fitted while being in contact with each other over the entire circumference thereof. The cylindrical connecting member 32 and the cover portion 42 are thus mutually positioned in the radial direction. In this manner, in the present embodiment, the second radially fitting portion J2 is structured by the axially extending portion 32a of the cylindrical connecting member 32 and the axially extending portion 44 of the cover portion 42. In the present embodiment, the second radially fitting portion J2 corresponds to a "radially fitting portion" in the present invention. Note that, in the present embodiment, the fourth seal member 84 is arranged between the axially extending portion 32a and the axially extending portion 44. The structure (second radially fitting portion J2) for mutually positioning the cylindrical connecting member 32 and the cover portion 42 in the radial direction is shared with the structure (first seal portion) for sealing the circulating oil pressure chamber H2.

The second fastening portion F2 is a portion for fastening the cylindrical connecting member 32 with the cover portion 42. In the present embodiment, the radial extension portion 32f of the cylindrical connecting member 32 and the outer radially extending portion 43 of the cover portion 42 are arranged so as to be in contact with each other via cover-side connecting portions 43a provided at a plurality of circumferential locations. That is, the arrangement is such that the radial extension portion 32f and the cover-side connecting portions 43a are axially in contact with each other, and the cover-side connecting portions 43a and the outer radially extending portion 43 are axially in contact with each other. Note that each of the cover-side connecting portions 43a is provided with a second bolt hole into which each of the second bolts 92 is tightened. Each of the cover-side connecting portions 43a is joined by welding or the like to a side face on the side in the axial first direction A1 of the outer radially extending portion 43, so as to rotate as a unit with the cover portion 42. The radial extension portion 32f, the cover-side connecting portions 43a, and the outer radially extending portion 43 are arranged in the state in which all center axes of the plurality of second bolt insert holes 32g provided in the radial extension portion 32f coincide with all center axes of the second bolt holes provided in the plurality of cover-side connecting portions 43a. The second bolts 92 are inserted through the respective second bolt insert holes 32g to be tightened to the second bolt holes. The radial extension portion 32f and the cover-side connecting portions 43a are thus fastened with each other by the second bolts 92, and the radial extension portion 32f is connected with the outer radially extending portion 43 via the cover-side connecting portions 43a. In the present embodiment, the second fastening portion F2 is constituted by the fastening portions between the radial extension portion 32f and the outer radially extending portion 43. Then, the cylindrical connecting member 32 is tightly fixed to the cover portion 42 and the pump impeller 41 without looseness by the second fastening portion F2. In the present embodiment, the second fastening portion F2 corresponds to a "fastening portion" in the present invention.

Note that, in the present embodiment, the first radially fitting portion J1 is provided radially inside relative to the first fastening portion F1. In the present embodiment, the first radially fitting portion J1 is structured by using a part of the support cylindrical portion 25 located at a radially inside end portion of the rotor support member 22, while the first fastening portion F1 is provided at a portion (portion near the rotor holding portion 23) on the radially outside of the radially extending portion 24 of the rotor support member 22. Therefore, the fitting projecting portion 25a and the cylindrical extending portion 32d constituting the first radially fitting portion J1 can be formed in a relatively small diameter. Consequently, accuracy of processing of these parts can be improved easily. Compared with the case of providing the first fastening portion F1 radially inside, it is possible, by applying the principle of leverage, to increase the maximum value of torque transmittable at the first fastening portion F1 via the first bolts 91. Note also that the second radially fitting portion J2 is provided radially inside relative to the second fastening portion F2. In the present example, the second radially fitting portion J2 and the second fastening portion F2 are arranged radially adjacent to each other.

In the present embodiment, the rotor support member 22, the cylindrical connecting member 32, and the cover portion 42 are structured as separate members independent of each other. For that reason, these members can be processed individually. Therefore, also from this point of view, each member can be easily processed into a desired form while improving accuracy of the processing. Particularly, it is easy to improve accuracy of center axes of the fitting projecting portion 25a and the cylindrical extending portion 32d constituting the first radially fitting portion J1, and accuracy of center axes of the axially extending portion 32a and the axially extending portion 44 constituting the second radially fitting portion J2, which require to be centered. Therefore, by coordination of the first fastening portion F1 and the second fastening portion F2 with the first radially fitting portion J1 and the second radially fitting portion J2, the integrated power transmission member T that is tightly connected to be fixed without looseness with a high degree of accuracy of center axis is provided as a rotational member that is in a drum shape as a whole. In the present embodiment, the operating oil pressure chamber H1 of the input clutch C1, the circulating oil pressure chamber H2, the operating oil pressure chamber H3 of the lock-up clutch C2, and the body portion housing chamber H4 are formed inside the power transmission member T provided in the manner described above.

As shown in FIG. 2, etc., the thus provided power transmission member T is radially supported, on the side in the axial first direction A1 thereof, on the outer circumferential face of the cylindrical projecting portion 11 provided as a unit with the end portion support wall 5, in a rotatable state via the first bearing 71. In the present example, as shown in FIG. 4, the first bearing 71 is arranged between the end portion support wall 5 and the cylindrical projecting portion 32e of the cylindrical connecting member 32 in the axial direction. Moreover, the first bearing 71 is arranged between the first seal member 81 and the cylindrical projecting portion 32e in the axial direction. On the other hand, the power transmission member T is radially supported, on the side in the axial second direction A2 thereof, on the inner circumferential face of the through hole of the pump cover 7 mounted on the intermediate support wall 6, in a rotatable state via the second bearing 72. As the second bearing 72, a bearing capable of receiving a radial force is employed. In the present example, a needle bearing is employed.

Here, the first bearing 71 and the second bearing 72 are arranged on the sides in the axial first direction A1 and the axial second direction A2, respectively, relative to the input clutch C1, the lock-up clutch C2, and the torque converter TC arranged radially inside the power transmission member T. In this manner, in the present embodiment, because the power transmission member T is radially supported over an axially long supporting span, the entire power transmission member T can be supported with a high degree of accuracy of center axis. Consequently, it is possible to improve the accuracy of supporting the input clutch C1, the rotary electric machine MG, and the torque converter TC, each of which is structured by using a part of the power transmission member T.

The input shaft I that is arranged in a state penetrating through the center axis through hole 11a of the cylindrical projecting portion 11 provided on the end portion support wall 5 is radially supported on the inner circumferential face of the cylindrical projecting portion 11, in a rotatable state via a third bearing 73. As the third bearing 73, a bearing capable of receiving a radial force is used. In the present example, a needle bearing is used. In the present embodiment, the input shaft I is radially supported against the center axis through hole 11a at a plurality of axial locations (here, at two locations). That is, the input shaft I is supported on the inner circumferential face of the cylindrical projecting portion 11 via two third bearings 73a and 73b separately arranged at a predetermined axial distance along the inner circumferential face of the cylindrical projecting portion 11. In this manner, by employing the structure of supporting the input shaft I at two points using the two third bearings 73a and 73b, the input shaft I can be reliably supported by the cylindrical projecting portion 11 while supporting accuracy can be improved.

Thus, in the present embodiment, the cylindrical projecting portion 11 can support, on the inner circumferential face thereof, the input shaft I connected to the clutch hub 31 of the input clutch C1 with a high degree of accuracy of center axis. In addition, the cylindrical projecting portion 11 can also support, on the outer circumferential face thereof, the power transmission member T that includes, as a part thereof, the cylindrical connecting member 32 serving as a clutch drum of the input clutch C1 with a high degree of accuracy of center axis. Therefore, the supporting accuracy of the input clutch C1 is highly improved. As a result, an engagement state of the input clutch C1 (including an engaging pressure by the piston 34 and a transfer torque capacity of the input clutch C1) can be controlled accurately.

In the case of using a drive device such as the drive device 1 according to the present embodiment in a one-motor parallel type hybrid vehicle, it is particularly strongly requested to accurately control the engagement state of the input clutch C1, for example, when performing internal combustion engine starting control or slip acceleration control. With the drive device 1 according to the present embodiment, the supporting accuracy of the input clutch C1 is very high, and thereby, desired engagement characteristics can be obtained with a high degree of accuracy when engaging the input clutch C1. Therefore, requests as described above can be met appropriately. Note that the internal combustion engine starting control refers to control that starts the internal combustion engine E by a torque of the rotary electric machine MG transmitted via the input clutch C1, and the slip acceleration control refers to control that accelerates the vehicle at least by a torque of the internal combustion engine E transmitted via the input clutch C1 with a slip between the input-side friction members and the output-side friction members of the input clutch C1.

3. Structure for Supplying Oil to Input Clutch

Next, description will be made of a structure for supplying oil to the operating oil pressure chamber H1 and the circulating oil pressure chamber H2 included in the input clutch C1 according to the present embodiment. Description will also be made of a structure for discharging oil from the circulating oil pressure chamber H2, etc. In the present embodiment, these structures are achieved by being mainly constituted by the four oil passages (first oil passage L1, second oil passage L2, third oil passage L3, and fourth oil passage L4) formed in the end portion support wall 5 and the cylindrical projecting portion 11 of the case 3. The description will be made below in detail.

Figure 5:
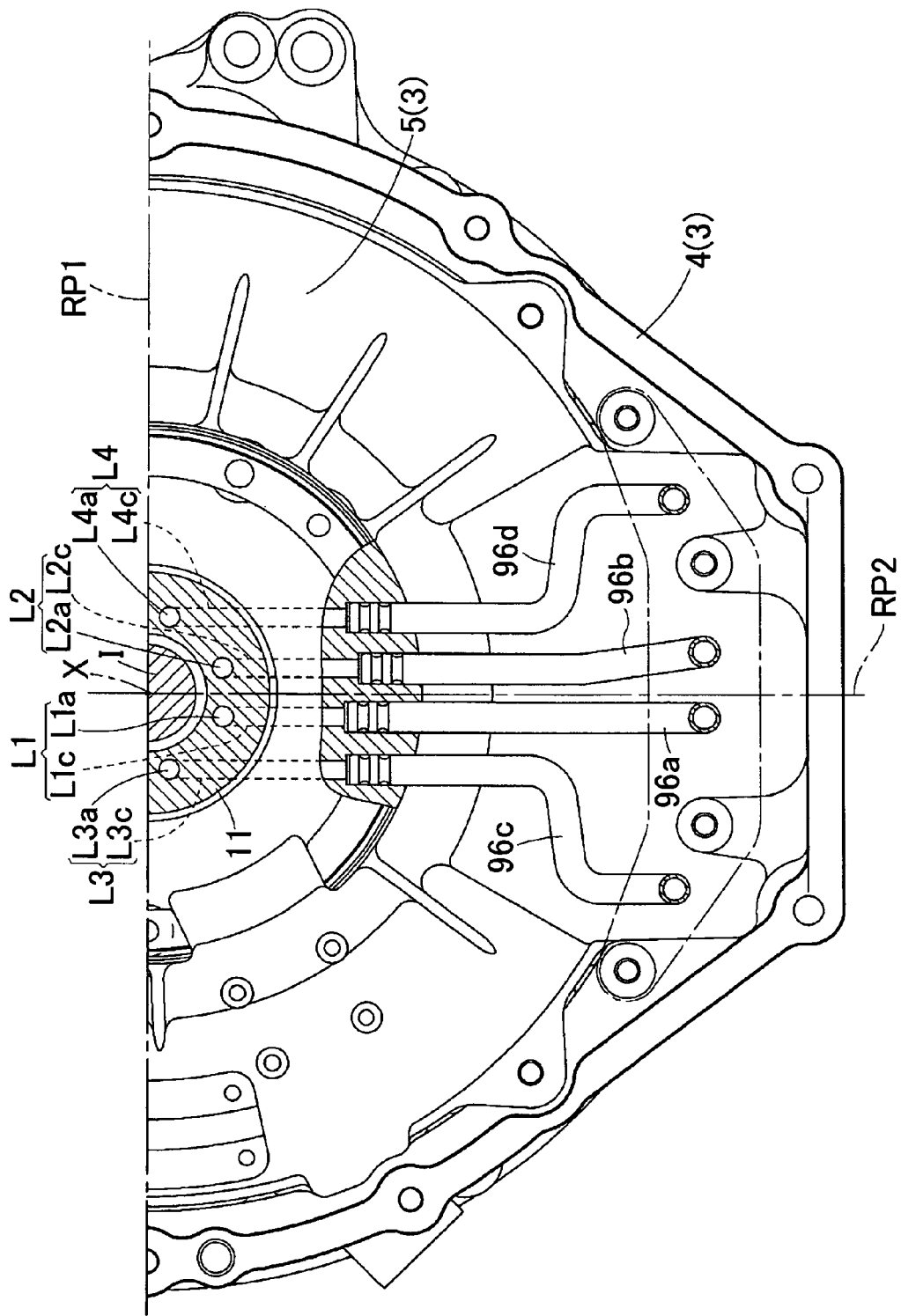
FIG. 5 is a view showing a layout of oil passages in an end portion support wall according to the embodiment of the present invention.

The first oil passage L1 is an oil supply passage communicating with the operating oil pressure chamber H1 of the input clutch C1 for supplying oil to the operating oil pressure chamber H1. In the present embodiment, the first oil passage L1 corresponds to an "operating oil supply passage" in the present invention. The first oil passage L1 is supplied, via a first oil passage forming member 96a (refer to FIG. 5), with the pressurized oil that is discharged by the oil pump 9 and regulated to the predetermined pressure level by the hydraulic pressure control device (not shown). As shown in FIGS. 4 and 5, the first oil passage L1 has a first axial oil passage L1a axially extending in the cylindrical projecting portion 11, a first radial oil passage L1b radially extending in the cylindrical projecting portion 11, and a first in-wall oil passage L1c radially extending in the end portion support wall 5 of the case 3. The first in-wall oil passage L1c is connected, at an end portion located radially outside thereof, to the first oil passage forming member 96a (refer to FIG. 5), and communicates, at an end portion located radially inside thereof, with the first axial oil passage L1a. The first axial oil passage L1a is formed so as to extend linearly from the end portion radially inside of the first in-wall oil passage L1c in the axial second direction A2 along the axial direction. The first radial oil passage L1b is formed so as to communicate with the first axial oil passage L1a, and to extend at least radially outward from the first axial oil passage L1a. In the present example, the first radial oil passage L1b is formed so as to extend linearly along a direction slightly inclined relative to the radial direction.

An end portion on the side in the axial second direction A2 of the first axial oil passage L1a is closed by a closing member (a plug, in the present example) provided in the cylindrical projecting portion 11. The first radial oil passage L1b is open to a first outer circumferential opening portion 12a formed on the outer circumferential face of the cylindrical projecting portion 11. The first outer circumferential opening portion 12a is formed on the outer circumferential face of a minimum diameter portion on the side in the axial second direction A2 relative to the second step portion 11c of the cylindrical projecting portion 11, thus being formed radially inside the sleeve 86 fitted around the end portion on the side in the axial second direction A2 of the cylindrical projecting portion 11. The sleeve 86 is formed with a recessed groove that continues circumferentially while being radially recessed relative to the outer circumferential face, and also formed, at a plurality of circumferential locations, with communication holes communicating between the inner circumferential face and the recessed groove of the sleeve 86. The communication holes and the first outer circumferential opening portion 12a are arranged in positions having portions overlapping with each other when viewed radially.

The cylindrical projecting portion 32e of the cylindrical connecting member 32 is formed with an oil hole 32h communicating the inner circumferential face with the outer circumferential face of the cylindrical projecting portion 32e. The oil hole 32h and the communication holes formed in the sleeve 86 are arranged in positions having portions overlapping with each other when viewed radially. The oil hole 32h communicates with the operating oil pressure chamber H1 via an opening portion located radially outside of the sleeve 86. Consequently, the first radial oil passage L1b communicates with the operating oil pressure chamber H1 via the first outer circumferential opening portion 12a, the communication holes of the sleeve 86, and the oil hole 32h. Accordingly, oil supplied from the first oil passage L1 is appropriately supplied to the operating oil pressure chamber H1 via the first outer circumferential opening portion 12a, the communication holes, and the oil hole 32h.

Note that, in the present embodiment, it is structured such that the oil leaks out little by little in the axial direction through a small space between the outer circumferential face of the sleeve 86 and the inner circumferential face of the cylindrical projecting portion 32e. Then, the oil leaking out through the small space to the side in the axial first direction A1 flows into the bearing arrangement space P, thus lubricating the first bearing 71 arranged in the bearing arrangement space P.

The second oil passage L2 is an oil supply passage communicating with the circulating oil pressure chamber H2 of the input clutch C1 for supplying oil to the circulating oil pressure chamber H2. In the present embodiment, the second oil passage L2 corresponds to a "differential pressure supply oil passage" in the present invention. The second oil passage L2 is supplied, via a second oil passage forming member 96b (refer to FIG. 5), with the pressurized oil that is discharged by the oil pump 9 and regulated to the predetermined pressure level by the hydraulic pressure control device (not shown). As shown in FIGS. 3 and 5, the second oil passage L2 has a second axial oil passage L2a axially extending in the cylindrical projecting portion 11 and a second in-wall oil passage L2c radially extending in the end portion support wall 5 of the case 3.

The second in-wall oil passage L2c is connected at an end portion located radially outside thereof to the second oil passage forming member 96b (refer to FIG. 5), and communicates at an end portion located radially inside thereof with the second axial oil passage L2a. The second axial oil passage L2a is formed so as to extend linearly from the end portion radially inside of the second in-wall oil passage L2c toward the axial second direction A2 along the axial direction.

The second axial oil passage L2a is open to an end face opening portion 12e formed on the end face on the side in the axial second direction A2 of the cylindrical projecting portion 11. The second axial oil passage L2a then communicates with the circulating oil pressure chamber H2 via the end face opening portion 12e. Accordingly, oil supplied from the second oil passage L2 is appropriately supplied to the circulating oil pressure chamber H2 via the end face opening portion 12e. More specifically, in the present embodiment, the second axial oil passage L2a communicates with a first space V1 located on the side in the axial first direction A1 relative to the clutch hub 31 radially extending in the circulating oil pressure chamber H2. Thus, the oil from the second oil passage L2 is supplied to the first space V1 in the circulating oil pressure chamber H2.

By being supplied with the oil via the second oil passage L2, the circulating oil pressure chamber H2 formed as an independent sealed space in the case 3 is basically placed in a state of being filled with oil. Then, the oil flows through inside of the circulating oil pressure chamber H2 while maintaining, as a whole, the state in which the circulating oil pressure chamber H2 is filled with oil. That is, the oil supplied from the second oil passage L2 to the first space V1 of the circulating oil pressure chamber H2 flows radially outward through between the piston 34 and the clutch hub 31 in the axial direction, and reaches the plurality of friction members 33. The oil cools the plurality of friction members 33 through heat exchange therewith. In the present embodiment, the plurality of friction members 33 of the input clutch C1 can be cooled efficiently by the oil filled in the circulating oil pressure chamber H2. The oil after cooling the plurality of friction members 33 flows radially inward through a second space V2 located on the side in the axial first direction A2 relative to the clutch hub 31 in the circulating oil pressure chamber H2, that is, located between the clutch hub 31 and the inner radially extending portion 45 of the cover portion 42 in the axial direction, and reaches a shaft-end hole portion Ib formed in an end portion on the side in the axial second direction A2 of the input shaft I. A space radially inside of the shaft-end hole portion Ib is located in a radially central portion of the second space V2.

A fifth oil passage L5 is formed at an end portion on the side in the axial second direction A2 of the input shaft I. The fifth oil passage L5 is supplied with the oil that has reached the shaft-end hole portion Ib after flowing through the inside of the circulating oil pressure chamber H2. As shown in FIG. 3, the fifth oil passage L5 has a fifth axial oil passage L5a axially extending inside the input shaft I along the center axis X, and a fifth radial oil passage L5b radially extending inside the input shaft I. The fifth axial oil passage L5a is formed so as to be open to a side face on the side in the axial second direction A2 in the shaft-end hole portion Ib of the input shaft I, and to extend linearly from the open portion toward the axial first direction A1 over a predetermined range. In the present example, the fifth axial oil passage L5a is formed so as to extend at least up to a location on the side in the axial first direction A1 relative to a first inner circumferential opening portion 12c (to be described later). The fifth radial oil passage L5b is formed so as to communicate with the fifth axial oil passage L5a, and to extend linearly from the fifth axial oil passage L5a along the radial direction. The fifth radial oil passage L5b is open to the outer circumferential face of the input shaft I between the two third bearings 73 arranged axially side by side with a predetermined space therebetween. Thus, the fifth oil passage L5 communicates the circulating oil pressure chamber H2 with a space between the outer circumferential face of the input shaft I and the inner circumferential face of the cylindrical projecting portion 11. Accordingly, the oil from the radially central portion of the second space V2 of the circulating oil pressure chamber H2 can be guided to the space between the input shaft I and the cylindrical projecting portion 11 via the fifth oil passage L5. In the present embodiment, the fifth oil passage L5 corresponds to a "communication oil passage" in the present invention.

In the present embodiment, out of the two third bearings 73 arranged axially side by side, the third bearing 73b located on the side in the axial second direction A2 communicates side faces on both axial sides thereof with the first space V1 and the second space V2, respectively, either directly or via the fifth oil passage L5. That is, in the third bearing 73b, the side face on the side in the axial second direction A2 directly communicates with the first space V1 in the circulating oil pressure chamber H2, whereas the side face on the side in the axial first direction A1 communicates with the second space V2 in the circulating oil pressure chamber H2 via the fifth oil passage L5. An equal hydraulic pressure can be thus applied to the side faces on both axial sides of the third bearing 73b. Consequently, leakage of the oil need not be taken into account between the third bearing 73b and the cylindrical projecting portion 11, and between the third bearing 73b and the input shaft I, thereby simplifying the structure of the third bearing 73b so as to reduce cost. In the present embodiment, the third bearing 73b located on the side in the axial second direction A2 corresponds to an "input bearing" in the present invention. Note that, in the present example, the third bearings 73 can also be lubricated by using a part of the oil discharged from the circulating oil pressure chamber H2 via the fifth oil passage L5.

The third oil passage L3 is an oil discharge passage communicating with the circulating oil pressure chamber H2 separately from the second oil passage L2 for discharging oil from the circulating oil pressure chamber H2. In the present embodiment, the third oil passage L3 corresponds to a "differential pressure discharge oil passage" in the present invention. As shown in FIGS. 3 and 5, the third oil passage L3 has a third axial oil passage L3a axially extending in the cylindrical projecting portion 11, a third radial oil passage L3b radially extending in the cylindrical projecting portion 11, and a third in-wall oil passage L3c radially extending in the end portion support wall 5 of the case 3. The third radial oil passage L3b is open to the first inner circumferential opening portion 12c formed on the inner circumferential face of the cylindrical projecting portion 11, between the two third bearings 73 arranged axially side by side with the predetermined space therebetween. Therefore, the third radial oil passage L3b communicates with the radially central portion of the second space V2 of the circulating oil pressure chamber H2, via the first inner circumferential opening portion 12c, the space between the input shaft I and the cylindrical projecting portion 11, and the fifth oil passage L5 formed inside the input shaft I. Note that, in the present example, the first inner circumferential opening portion 12c and the fifth radial oil passage L5b constituting the fifth oil passage L5 are arranged in positions having portions overlapping with each other when viewed radially.

The third radial oil passage L3b is formed so as to extend at least radially outward from the first inner circumferential opening portion 12c. In the present example, the third radial oil passage L3b is formed so as to extend linearly along a direction inclined relative to the radial direction. The third axial oil passage L3a is formed so as to communicate with an end portion located radially inside of the third radial oil passage L3b, and to extend linearly along the axial direction. An end portion on the side in the axial second direction A2 of the third axial oil passage L3a is closed by a closing member (a plug, in the present example) provided in the cylindrical projecting portion 11. The third in-wall oil passage L3c communicates, at an end portion located radially inside thereof, with an end portion on the side in the axial first direction A1 of the third axial oil passage L3a, and connected, at an end portion located radially outside thereof, to a third oil passage forming member 96c (refer to FIGS. 2 and 5). Accordingly, the oil after cooling the plurality of friction members 33 while flowing through the inside of the circulating oil pressure chamber H2 is discharged via the fifth oil passage L5 and the third oil passage L3, and then returned to the oil pan (not shown) via the third oil passage forming member 96c.

The fourth oil passage L4 is an oil discharge passage for discharging oil from the bearing arrangement space P. In the present embodiment, the fourth oil passage L4 corresponds to a "lubricating oil discharge passage" in the present invention. As shown in FIGS. 4 and 5, the fourth oil passage L4 has a fourth axial oil passage L4a axially extending in the cylindrical projecting portion 11, a fourth radial oil passage L4b radially extending in the cylindrical projecting portion 11, and a fourth in-wall oil passage L4c radially extending in the end portion support wall 5 of the case 3. The fourth radial oil passage L4b is open to a second outer circumferential opening portion 12b formed on the outer circumferential face of the cylindrical projecting portion 11. The second outer circumferential opening portion 12b is formed so as to face the bearing arrangement space P between the first seal member 81 and the first bearing 71 in the axial direction. In the present example, the second outer circumferential opening portion 12b is formed across the large-diameter and the small-diameter portions at the location where the first step portion 11b is provided on the outer circumferential face of the cylindrical projecting portion 11.

The fourth radial oil passage L4b is formed so as to extend at least radially inward from the second outer circumferential opening portion 12b. In the present example, the fourth radial oil passage L4b is formed so as to extend linearly along a direction inclined relative to the radial direction. In the present embodiment, the fourth radial oil passage L4b is also open to a second inner circumferential opening portion 12d formed on the inner circumferential face of the cylindrical projecting portion 11 between the second seal member 82 and the third bearings 73 (the third bearing 73a arranged on the side in the axial first direction A1, in the present example) in the axial direction. In this manner, the third bearing 73a can also be lubricated by using the oil from the bearing arrangement space P.

The fourth axial oil passage L4a is formed so as to communicate with the fourth radial oil passage L4b, and to extend linearly along the axial direction. An end portion on the side in the axial second direction A2 of the fourth axial oil passage L4a is closed by a closing member (a plug, in the present example) provided in the cylindrical projecting portion 11. The fourth in-wall oil passage L4c communicates, at an end portion located radially inside thereof, with an end portion on the side in the axial first direction A1 of the fourth axial oil passage L4a, and connected, at an end portion located radially outside thereof, to a fourth oil passage forming member 96d (refer to FIG. 5). As described above, a part of the oil supplied via the first oil passage L1 to the operating oil pressure chamber H1 flows into the bearing arrangement space P through the small space between the outer circumferential face of the sleeve 86 and the inner circumferential face of the cylindrical projecting portion 32e of the cylindrical connecting member 32, and lubricates the first bearing 71 arranged in the bearing arrangement space P. The oil after lubricating the first bearing 71 in the bearing arrangement space P is discharged via the fourth oil passage L4, and then returned to the oil pan (not shown) via the fourth oil passage forming member 96d.

In the present embodiment, as shown in FIG. 5, all of the four oil passages L1 to L4 are formed on one side relative to a predetermined first reference plane RP1 (on the lower side in FIG. 5, in the present example). Furthermore, both the first and the third passages L1 and L3 are formed on one side relative to a predetermined second reference plane RP2 (on the left side in FIG. 5, in the present example) whereas the second and the fourth passages L2 and L4 are formed on the other side relative to the second reference plane RP2 (on the right side in FIG. 5, in the present example). Moreover, the first and the second passages L1 and L2 serving as oil supply passages to the operating oil pressure chamber H1 and the circulating oil pressure chamber H2, respectively, of the input clutch C1 are formed in positions plane-symmetric to each other with respect to the second reference plane RP2. Furthermore, the third and the fourth passages L3 and L4 serving as oil discharge passages from the circulating oil pressure chamber H2 and the bearing arrangement space P, respectively, are also formed in positions plane-symmetric to each other with respect to the second reference plane RP2. Note that, in the present example, the right-left direction in FIG. 5 coincides with the horizontal direction whereas the up-down direction in FIG. 5 coincides with the vertical direction. Further, the horizontal plane passing through the center axis X is referred to as the first reference plane RP1 whereas the vertical plane passing through the center axis X is referred to as the second reference plane RP2.

The third axial oil passage L3$a$, the first axial oil passage L1$a$, the second axial oil passage L2$a$, and the fourth axial oil passage L4$a$, all of which are formed inside the cylindrical projecting portion 11, are arranged circumferentially in that order when viewed axially. All of the in-wall oil passages L1$c$ to L4$c$ are formed, inside the end portion support wall 5 of the case 3, along the vertical direction so as to be in parallel with the second reference plane RP2. In that formation, the third in-wall oil passage L3$c$, the first in-wall oil passage L1$c$, the second in-wall oil passage L2$c$, and the fourth in-wall oil passage L4$c$ are arranged in that order in the direction along the first reference plane RP1 when viewed axially.

The first and the second oil passage forming members 96$a$ and 96$b$ connected to the first and the second oil passages L1 and L2, respectively, are formed so as to extend linearly in parallel with the second reference plane RP2 when viewed axially. On the other hand, each of the third and the fourth oil passage forming members 96$c$ and 96$d$ connected to the third and the fourth oil passages L3 and L4, respectively, is formed so as to be bent at two locations, and so that outside portions relative to the respective bending points (a portion on the side of the in-wall oil passage L3$c$ or L4$c$, and a portion on the side of the oil pan [not shown]) extend linearly in parallel with the second reference plane RP2 when viewed axially.

4. Other Embodiments

Finally, other embodiments of the drive device for a vehicle according to the present invention will be described. Note that each structure to be disclosed in each embodiment is not only applied to that embodiment, but may also be applied in combination with any structure disclosed in other embodiments, unless any contradiction occurs.

(1) The above embodiment has been described by way of an example in which the input clutch C1 and the cylindrical projecting portion 11 are arranged in positions having portions overlapping with each other when viewed radially. However, embodiments of the present invention are not limited to this example. That is, it is also one of preferred embodiments of the present invention to have a structure in which, for example, the input clutch C1 and the cylindrical projecting portion 11 are arranged in axially different positions so as not to have portions overlapping with each other when viewed radially.

(2) The above embodiment has been described by way of an example in which the cylindrical projecting portion 11 of the case 3 is formed with the first oil passage L1 for supplying oil to the operating oil pressure chamber H1 of the input clutch C1, the second oil passage L2 for supplying oil to the circulating oil pressure chamber H2, the third oil passage L3 for discharging oil from the circulating oil pressure chamber H2, and the fourth oil passage L4 for discharging oil from the bearing arrangement space P. However, embodiments of the present invention are not limited to this example. That is, it is also one of preferred embodiments of the present invention to have a structure in which, for example, one of more of the oil passages L1 to L4 are formed in a portion (such as the intermediate shaft M) different from the cylindrical projecting portion 11 in the case 3.

(3) The above embodiment has been described by way of an example in which the power transmission member T is structured such that the rotor support member 22, the cylindrical connecting member 32, and the cover portion 42 are connected by the first fastening portion F1 and the second fastening portion F2 so as to rotate as a unit with each other, and is provided with the first radially fitting portion J1 and the second radially fitting portion J2. However, embodiments of the present invention are not limited to this example. That is, the first and the second radially fitting portions J1 and J2 are provided in order to radially position the members constituting the power transmission member T in an accurate manner; therefore, one or both of the first and the second radially fitting portions J1 and J2 can be omitted depending on the accuracy of center axis required for the power transmission member T. It is also one of preferred embodiments of the present invention to have a structure in which, for example, the power transmission member T is provided only with the first fastening portion F1, the second fastening portion F2, and the first radially fitting portion J1. In this case, the structure is preferably such that, for example, the fourth seal member 84 such as an O-ring is arranged between the radial extension portion 32$f$ and the outer radially extending portion 43 constituting the second fastening portion F2 so as to suppress the oil from flowing out to the side of the stator St of the rotary electric machine MG by sealing the circulating oil pressure chamber H2.

(4) The above embodiment has been described by way of an example in which the radially extending portion 24 and the mounting portion 32$c$ are fastened with each other by the first bolts 91, in the first fastening portion F1. The example has also been described in the case in which the radial extension portion 32$f$ and the outer radially extending portion 43 are fastened with each other via the cover-side connecting portions 43$a$ by the second bolts 92, in the second fastening portion F2. However, embodiments of the present invention are not limited to this example. That is, it is also one of preferred embodiments of the present invention to have a structure in which two members to be fastened with each other are joined together by welding in one or both of the first fastening portion F1 and the second fastening portion F2.

(5) The above embodiment has been described by way of an example in which the second fastening portion F2 is structured such that the radial extension portion 32$f$ and the cover-side connecting portions 43$a$ are fastened with each other by the second bolts 92, and the radial extension portion 32$f$ is connected with the outer radially extending portion 43 via the cover-side connecting portions 43$a$. However, embodiments of the present invention are not limited to this example. That is, it is also one of preferred embodiments of the present invention to have a structure in which the second fastening portion F2 is structured by directly fastening the radial extension portion 32$f$ and the outer radially extending portion 43 with each other by the second bolts 92 without interposing such portions as the cover-side connecting portions 43$a$. In this case, it is preferably that the junction of the outer radially extending portion 43 to the radial extension portion 32$f$ is provided as a thick-walled portion having predetermined thickness in the axial and radial directions, and the thick-walled portion is provided with the second bolt holes into which the second bolts 92 are tightened.

(6) The above embodiment has been described by way of an example in which the oil passages L1 to L5 formed in the cylindrical projecting portion 11 have the axial oil passages L1$a$ to L5$a$, all of which are formed so as to extend linearly along the axial direction. However, embodiments of the present invention are not limited to this example. That is, it is also one of preferred embodiments of the present invention to have a structure in which, for example, one or more of the oil passages L1$a$ to L5$a$ are formed so as to extend linearly along a direction inclined relative to the axial direction. Moreover, it is also one of preferred embodiments of the present invention to have a structure in which one or more of the oil passages L1$a$ to L5$a$ are formed so as to bend at a predetermined axial location or to extend in a curved manner. Note that the same applies to the radial oil passages L1$b$, and L3$b$ to L5$b$ in the case where the oil passages L1 to L5 are provided with the radial oil passages L1$b$, and L3$b$ to L5$b$.

(7) The above embodiment has been described by way of an example in which the second oil passage L2 for supplying oil to the circulating oil pressure chamber H2 has only the second axial oil passage L2$a$, and the third oil passage L3 for discharging oil from the circulating oil pressure chamber H2 has the third axial oil passage L3$a$ and the third radial oil passage L3$b$. However, embodiments of the present invention are not limited to this example. That is, it is also one of preferred embodiments of the present invention to have a structure in which, for example, the second oil passage L2 has an axial oil passage and a radial oil passage, and the third oil passage L3 has only an axial oil passage. In this case, the structure is preferably such that the second oil passage L2 communicates with the second space V2 of the circulating oil pressure chamber H2 via an inner circumferential opening portion formed on the inner circumferential face of the cylindrical projecting portion 11 and the fifth oil passage L5 formed inside the input shaft I, while the third oil passage L3 communicates with the first space V1 of the circulating oil pressure chamber H2 via an end face opening portion formed on the end face on the side in the axial second direction A2 of the cylindrical projecting portion 11. In this case, the circulating direction of oil in the circulating oil pressure chamber H2 is opposite to the circulating direction described in the above embodiment.

(8) The above embodiment has been described by way of an example in which the sixth oil passage L6 supplying oil to the body portion housing chamber H4 is formed in the intermediate shaft M. However, embodiments of the present invention are not limited to this example. That is, it is also one of preferred embodiments of the present invention to have a structure in which, for example, the sixth oil passage L6 is formed in a part (such as the case 3) different from the intermediate shaft M.

(9) The above embodiment has been described with a case in mind in which the input clutch C1 is structured as a so-called normally open type friction engagement device. However, embodiments of the present invention are not limited to this case. That is, it is also one of preferred embodiments of the present invention to structure the input clutch C1 as a so-called normally closed type friction engagement device.

Figure 6:
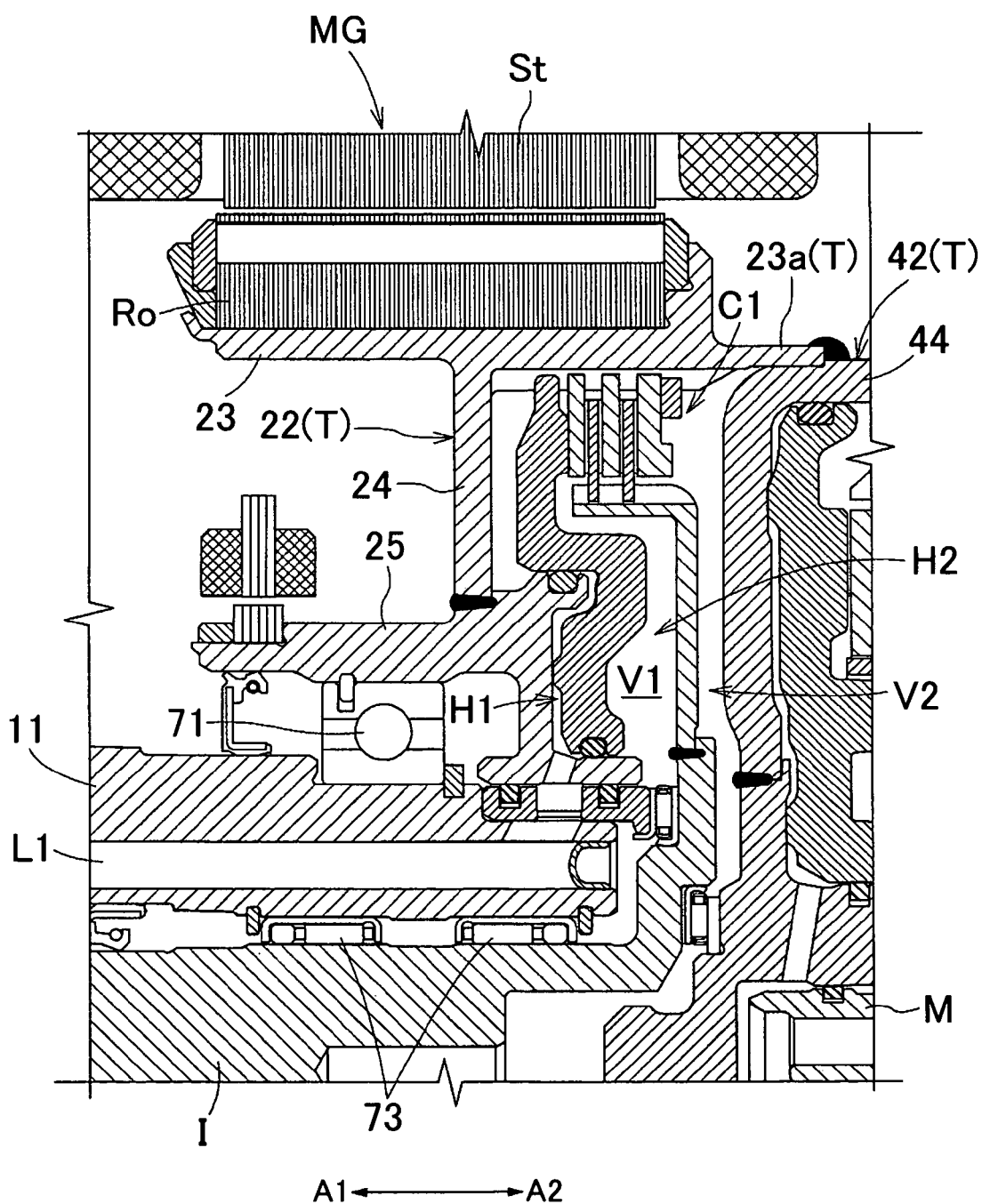
FIG. 6 is an essential part cross-sectional view of a drive device according to another embodiment of the present invention.

(10) The above embodiment has been described by way of an example in which the rotor support member 22 and the cylindrical connecting member 32 are structured as separate members independent of each other. However, embodiments of the present invention are not limited to this example. That is, it is also one of preferred embodiments of the present invention to have a structure in which, for example, the rotor support member 22 and the cylindrical connecting member 32 are provided as a unit with each other. FIG. 6 shows an example of such a structure. In the example shown, the rotor holding portion 23 of the rotor support member 22 is structured to function as a clutch drum of the input clutch C1, while the rotor support member 22 and the cover portion 42 are directly fixed to each other via the rotor holding portion 23. In the present example, an axially projecting portion 23$a$ of a cylindrical shape projects from an end portion on the side in the axial second direction A2 of the rotor holding portion 23 further in the axial second direction A2; then, the inner circumferential face of the axially projecting portion 23$a$ and the outer circumferential face of the axially extending portion 44 are connected to be fixed integrally to each other by being joined together by welding in the state of being mutually fitted while being in contact with each other over the entire circumference.

(11) The above embodiment has been described by way of an example in which the clutch hub 31 is drivingly connected so as to rotate as a unit with the input shaft I, while the cylindrical connecting member 32 constituting the power transmission member T functions as a clutch drum paired with the clutch hub 31. However, embodiments of the present invention are not limited to this example. That is, it is also one of preferred embodiments of the present invention to have a structure in which, for example, a clutch drum is drivingly connected so as to rotate as a unit with the input shaft I, while the cylindrical connecting member 32 is formed so as to have a clutch hub paired with the clutch drum.

(12) The above embodiment has been described by way of an example in which the torque converter TC having the pump impeller 41, the turbine runner 51, and the stator 56 is provided as a fluid coupling in the drive device 1. However, embodiments of the present invention are not limited to this example. That is, it is also one of preferred embodiments of the present invention to have a structure in which, for example, a fluid coupling or the like having only the pump impeller 41 and the turbine runner 51 without having the stator 56 is provided as the fluid coupling in the drive device 1.

(13) The above embodiment has been described by way of an example in which the drive device 1 has a structure suitable for being mounted in an FR (front engine, rear drive) type vehicle, that is, a single-axis structure in which the entire device is coaxially arranged. However, embodiments of the present invention are not limited to this example. That is, it is also one of preferred embodiments of the present invention to structure the drive device to have a double-axis structure in which, for example, a counter gear mechanism or the like is provided, and an axle is arranged having a center axis different from the center axis X shared by the input shaft I and the intermediate shaft M. The drive device having such a structure is suitable for being mounted in an FF (front engine, front drive) type vehicle.

(14) Regarding also other structures, the embodiments disclosed herein are examples in all respects, and embodiments of the present invention are not limited to these examples. That is, as far as including a structure described in the claims of the present application and a structure equivalent thereto, a structure obtained by appropriately modifying a part of the structure that is not described in the claims also falls within the technical range of the present invention as a matter of course.

The present invention can preferably be used for a drive device for a vehicle equipped with an input member drivingly connected to an internal combustion engine, an output member drivingly connected to a wheel, a rotary electric machine, a fluid coupling, an engagement device selectively drivingly connecting the input member with the rotary electric machine and the fluid coupling, and a case housing at least the rotary electric machine, the engagement device, and the fluid coupling.

The invention claimed is:
1. A drive device for a vehicle, comprising:
an input member drivingly connected to an internal combustion engine;
a rotary electric machine;
an output member that is configured to transmit torque from one or both of the internal combustion engine and the rotary electric machine;

a fluid coupling;
an engagement device that selectively switches between a state where the input member is connected with the rotary electric machine and the fluid coupling and a state where the input member is not connected with the rotary electric machine and the fluid coupling; and
a case configured by assembling a plurality of housings in order to house at least the rotary electric machine, the engagement device, and the fluid coupling, wherein
the engagement device includes an engagement member, a pressing member and a differential pressure generating chamber that is formed so as to apply hydraulic pressure toward a direction in which the engagement member is disengaged when oil is supplied to the differential pressure generating chamber,
a body portion housing chamber housing a body portion of the fluid coupling, the body portion housing chamber and the differential pressure generating chamber are structured as oil chambers separated from each other,
the drive device includes a coupling supply oil passage supplying oil to the body portion housing chamber and a differential pressure supply oil passage supplying the oil to the differential pressure generating chamber,
pressurized oil that is regulated to a respective predetermined pressure level by a hydraulic pressure control device is supplied to each of the coupling supply oil passage and the differential pressure supply oil passage, and
the differential pressure generating chamber communicate with an oil passage for discharging oil from the differential pressure generating chamber and communicates with the differential pressure supply oil passage with the differential pressure generating chamber between the oil passage and the differential pressure supply oil passage.

2. The drive device for a vehicle according to claim 1, wherein
the case includes a support wall extending at least radially and a cylindrical projecting portion axially projecting from the support wall, and
the engagement device is arranged in a position having a portion overlapping with the cylindrical projecting portion when viewed radially, and the cylindrical projecting portion is formed with the differential pressure supply oil passage.

3. The drive device for a vehicle according to claim 2, wherein
the fluid coupling and an engagement output side member of the engagement device are connected so as to rotate as a unit with each other and arranged axially adjacent to each other,
the engagement device includes an operating oil pressure chamber to which engagement hydraulic pressure is supplied, and
the differential pressure generating chamber is arranged between the operating oil pressure chamber and the fluid coupling in the axial direction.

4. The drive device for a vehicle according to claim 3, wherein
the fluid coupling includes a cover portion housing the body portion,
the engagement device further includes an engagement input side member and an engagement output side member paired with the engagement input side member,
the engagement output side member and the cover portion are connected so as to rotate as a unit with each other,
the engagement input side member is an annular plate-shaped member radially extending so as to support the engagement member from radially inside of the engagement member
the input member arranged so as to penetrate through the radially inside of the cylindrical projecting portion and the engagement input side member are connected so as to rotate as a unit with each other to structure an input transmission member,
the input member includes a flange portion extending radially outward, with the engagement input side member joined with the flange portion,
a first seal portion seals between the engagement output side member and the cover portion while a second seal portion seals between the input transmission member and the cylindrical projecting portion, and
the differential pressure generating chamber is defined by the engagement output side member, the cover portion, the input transmission member, and the cylindrical projecting portion, and formed as the sealed space by the first seal portion and the second seal portion.

5. The drive device for a vehicle according to claim 4, wherein
the engagement output side member includes an axial extension portion extending along the axial direction and a radial extension portion extending radially outward from the axial extension portion,
the cover portion includes an axially extending portion extending along the axial direction and a radially extending portion extending radially outward from the axially extending portion,
the axial extension portion and the axially extending portion radially contact and fit against each other so as to constitute a radially fitting portion that determines mutual positioning in the radial direction, and the radial extension portion and the radially extending portion are fastened with each other by a bolt so as to constitute a fastening portion, and
the first seal portion is formed of the axial extension portion and the axially extending portion that constitute the radially fitting portion, and a seal member arranged therebetween.

6. The drive device for a vehicle according to claim 2, wherein
the cylindrical projecting portion is provided so as to project from the support wall arranged on the internal combustion engine side in the axial direction relative to the engagement device toward the side opposite to the internal combustion engine, and
the differential pressure supply oil passage has an axial oil passage axially extending in the cylindrical projecting portion to communicate with the differential pressure generating chamber via an end face opening portion formed in an end face of the cylindrical projecting portion on the side opposite to the internal combustion engine.

7. The drive device for a vehicle according to claim 2, wherein the cylindrical projecting portion is further formed with, separately from the differential pressure supply oil passage, the oil passage for discharging oil from the differential pressure generating chamber.

8. The drive device for a vehicle according to claim 6, wherein the cylindrical projecting portion is further formed with, separately from the differential pressure supply oil passage, the oil passage for discharging oil from the differential pressure generating chamber.

9. The drive device for a vehicle according to claim 7, wherein
the engagement device further includes an engagement input side member and an engagement output side member paired with the engagement input side member,
the engagement input side member radially extends in the differential pressure generating chamber, and a radially inside end portion of the engagement input side member is connected to the input member arranged so as to penetrate through the radially inside of the cylindrical projecting portion,
the differential pressure supply oil passage communicates with a first space in the differential pressure generating chamber on the internal combustion engine side relative to the engagement input side member, and
the differential pressure discharge oil passage communicates, via a communication oil passage formed inside the input member, with a second space in the differential pressure generating chamber on the side opposite to the internal combustion engine relative to the engagement input side member.

10. The drive device for a vehicle according to claim 8, wherein
the engagement device further includes an engagement input side member and an engagement output side member paired with the engagement input side member,
the engagement input side member radially extends in the differential pressure generating chamber, and a radially inside end portion of the engagement input side member is connected to the input member arranged so as to penetrate through the radially inside of the cylindrical projecting portion,
the differential pressure supply oil passage communicates with a first space in the differential pressure generating chamber on the internal combustion engine side relative to the engagement input side member, and
the differential pressure discharge oil passage communicates, via a communication oil passage formed inside the input member, with a second space in the differential pressure generating chamber on the side opposite to the internal combustion engine relative to the engagement input side member.

11. The drive device for a vehicle according to claim 9, wherein
an input bearing radially supporting the input member is arranged between the cylindrical projecting portion and the input member, and
side faces on both axial sides of the input bearing communicate with the first space and the second space, respectively, either directly or via the communication oil passage.

12. The drive device for a vehicle according to claim 10, wherein
an input bearing radially supporting the input member is arranged between the cylindrical projecting portion and the input member, and
side faces on both axial sides of the input bearing communicate with the first space and the second space, respectively, either directly or via the communication oil passage.

13. The drive device for a vehicle according to claim 2, wherein
the cylindrical projecting portion is further formed with an operating oil supply passage supplying oil for operation of the pressing member to an operating oil pressure chamber of the engagement device, and
the operating oil supply passage includes an axial oil passage axially extending in the cylindrical projecting portion, and a radial oil passage radially extending from the axial oil passage and communicating with the operating oil pressure chamber via an outer circumferential opening portion formed in an outer circumferential face of the cylindrical projecting portion.

14. The drive device for a vehicle according to claim 3, wherein
the cylindrical projecting portion is further formed with an operating oil supply passage supplying oil for operation of the pressing member to operating oil pressure chamber of the engagement device, and
the operating oil supply passage includes an axial oil passage axially extending in the cylindrical projecting portion, and a radial oil passage radially extending from the axial oil passage and communicating with the operating oil pressure chamber via an outer circumferential opening portion formed in an outer circumferential face of the cylindrical projecting portion.

15. The drive device for a vehicle according to claim 6, wherein
the cylindrical projecting portion is further formed with an operating oil supply passage supplying oil for operation of the pressing member to an operating oil pressure chamber of the engagement device, and
the operating oil supply passage includes an axial oil passage axially extending in the cylindrical projecting portion, and a radial oil passage radially extending from the axial oil passage and communicating with the operating oil pressure chamber via an outer circumferential opening portion formed in an outer circumferential face of the cylindrical projecting portion.

16. The drive device for a vehicle according to claim 2, wherein
the rotary electric machine includes a rotor body and a rotor support member extending radially inward from the rotor body on the internal combustion engine side relative to the engagement device so as to support the rotor body,
the rotor support member is radially supported by the cylindrical projecting portion in a rotatable state via a support bearing,
a third seal portion seals between the rotor support member and the cylindrical projecting portion on the internal combustion engine side relative to the support bearing, and
the cylindrical projecting portion is further formed with a lubricating oil discharge passage that communicates with a bearing arrangement space defined by the cylindrical projecting portion, the rotor support member, and the third seal portion and discharges oil that has lubricated the support bearing from the bearing arrangement space.

17. The drive device for a vehicle according to claim 1, wherein:
oil passages for supplying oil to the differential pressure generating chamber are formed in the case, and
an oil passage for supplying oil to the fluid coupling is formed in a shaft member.

18. The drive device for a vehicle according to claim 1, wherein the body portion housing chamber houses the body portion of the fluid coupling and a lock-up clutch.

* * * * *